(12) United States Patent
Park et al.

(10) Patent No.: US 11,265,830 B2
(45) Date of Patent: Mar. 1, 2022

(54) STRONG AND RELIABLE 5G NEW RADIO COMMUNICATION METHOD AND DEVICE THEREFOR

(71) Applicant: Samsung Electronics Co., Ltd., Suwon-si (KR)

(72) Inventors: Seunghoon Park, Seoul (KR); Jungmin Moon, Suwon-si (KR); Byounghoon Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 504 days.

(21) Appl. No.: 16/321,604

(22) PCT Filed: Aug. 9, 2017

(86) PCT No.: PCT/KR2017/008597
§ 371 (c)(1),
(2) Date: Jan. 29, 2019

(87) PCT Pub. No.: WO2018/030774
PCT Pub. Date: Feb. 15, 2018

(65) Prior Publication Data
US 2021/0297961 A1    Sep. 23, 2021

Related U.S. Application Data

(60) Provisional application No. 62/373,620, filed on Aug. 11, 2016.

(51) Int. Cl.
*H04W 4/00* (2018.01)
*H04W 56/00* (2009.01)
*H04W 48/08* (2009.01)

(52) U.S. Cl.
CPC ......... *H04W 56/001* (2013.01); *H04W 48/08* (2013.01)

(58) Field of Classification Search
CPC . H04W 56/01; H04W 48/08; H04W 74/0808; H04W 16/14; H04W 72/0446;
(Continued)

(56) References Cited

U.S. PATENT DOCUMENTS 9,301,269 B1 * 3/2016 Zhao ................... H04W 56/001
2009/0168748 A1 7/2009 Kishiyama et al.
(Continued)

FOREIGN PATENT DOCUMENTS

KR    10-2015-0089896 A    8/2015
KR    10-2016-0036674 A    4/2016
(Continued)

OTHER PUBLICATIONS

Korean Office Action dated Mar. 17, 2021, issued in Korean Application No. 10-2017-0100965.

*Primary Examiner* — Stephen M D Agosta
(74) *Attorney, Agent, or Firm* — Jefferson IP Law, LLP

(57) ABSTRACT

Disclosed are a communication technique for merging, with IoT technology, a 5G communication system for supporting a data transmission rate higher than that of a 4G system, and a system therefor. The present disclosure can be applied to an intelligent service (for example, smart home, smart building, smart city, smart car or connected car, healthcare, digital education, retail, security and safety-related services, and the like) on the basis of a 5G communication technology and an IoT-related technology. Provided are a terminal operation method in a wireless communication system and a device for performing the same, the method according to an embodiment of the present invention comprises the steps of: monitoring a synchronization signal transmitted by a base station, on the basis of a synchronization resource section; receiving the synchronization signal on the basis of the synchronization signal monitoring; and accessing the base station on the basis of the synchronization acquired
(Continued)

from the synchronization signal, wherein the synchronization resource section of the synchronization signal transmission cycle comprises a plurality of synchronization signal transmission time points.

12 Claims, 31 Drawing Sheets

(58) Field of Classification Search
CPC .......... H04W 56/0015; H04W 72/0426; H04L 5/0048; H04L 27/0006; H04L 5/0007; H04L 5/001; H04L 5/008; H04L 43/16; H04L 5/0035; H04B 7/0452; H04B 7/0608; H04B 7/0626; H04J 11/0053
See application file for complete search history.

(56) References Cited

U.S. PATENT DOCUMENTS

| | | | |
|---|---|---|---|
| 2010/0279707 A1* | 11/2010 | Fischer | G01S 5/14 455/456.1 |
| 2014/0050206 A1 | 2/2014 | Seo et al. | |
| 2015/0146680 A1 | 5/2015 | Luo et al. | |
| 2015/0215763 A1 | 7/2015 | Ro et al. | |
| 2016/0095074 A1 | 3/2016 | Park et al. | |
| 2016/0142994 A1 | 5/2016 | Luo et al. | |
| 2016/0249350 A1 | 8/2016 | Koutsimanis et al. | |
| 2017/0078994 A1* | 3/2017 | Dinan | H04W 56/0005 |
| 2017/0230986 A1 | 8/2017 | Moon et al. | |
| 2019/0053177 A1* | 2/2019 | Niu | H04L 23/02 |
| 2019/0059106 A1* | 2/2019 | Zhang | H04W 72/0446 |
| 2019/0104546 A1* | 4/2019 | Chendamarai Kannan | H04B 7/0695 |
| 2019/0124614 A1* | 4/2019 | Li | H04W 74/0808 |
| 2019/0349799 A1* | 11/2019 | Siomina | H04L 1/1887 |
| 2019/0357270 A1* | 11/2019 | Kurth | H04W 76/27 |
| 2020/0022185 A1* | 1/2020 | Luo | H04W 74/0808 |
| 2020/0037277 A1* | 1/2020 | Huang | H04W 72/02 |
| 2020/0067661 A1* | 2/2020 | Siomina | H04L 5/0073 |

FOREIGN PATENT DOCUMENTS

| | | |
|---|---|---|
| KR | 10-2016-0093573 A | 8/2016 |
| WO | 2012/148236 A2 | 11/2012 |
| WO | 2016/053173 A1 | 4/2016 |

* cited by examiner

STRONG AND RELIABLE 5G NEW RADIO COMMUNICATION METHOD AND DEVICE THEREFOR

TECHNICAL FIELD

The disclosure relates to a communication method of an NR system.

More specifically, the disclosure a method and device for providing reliable communication for an unlicensed/shared/mmWave band in a system in which a resource for communication between devices is shared.

BACKGROUND ART

In order to satisfy a wireless data traffic demand that tends to increases after the $4^{th}$-generation (4G) communication system commercialization, efforts to develop an improved 5th-generation (5G) communication system or pre-5G communication system is being made. For this reason, the 5G communication system or pre-5G communication system is called a beyond 4G network communication system or a post LTE system.

In order to achieve a high data transfer rate, the 5G communication system is considered to be implemented in an mmWave band (e.g., 60 GHz band). In order to reduce a loss of electric waves and increase the transfer distance of electric waves in the mmWave band, beamforming, massive MIMO, full dimensional MIMO (FD-MIMO), array antenna, analog beam-forming and large scale antenna technologies are being discussed in the 5G communication system.

Furthermore, in order to improve the network of a system, technologies, such as an improved small cell, an advanced small cell, a cloud radio access network (cloud RAN), an ultra-dense network, device to device communication (D2D), wireless backhaul, a moving network, cooperative communication, coordinated multi-points (CoMP) and reception interference cancellation, are being developed in the 5G communication system.

In addition, hybrid FSK and QAM modulation (FQAM) and sliding window superposition coding (SWSC) that are advanced coding modulation (ACM) schemes, improved filter bank multi-carrier (FBMC), non-orthogonal multiple access (NOMA) and sparse code multiple access (SCMA) are being developed in the 5G system.

With the development of LTE, in order to improve the speed and capacity of an LTE network, enhanced technologies, such as LTE in unlicensed spectrum (LTE-U) using a shared band, are researched. LTE-U or licensed-assisted access (LLA) means a technology in which a licensed spectrum or licensed band and an unlicensed spectrum or unlicensed band in addition to the existing licensed band used for LTE communication are integrated using a carrier aggregation (CA), and it can support quality of service (QoS) and smooth mobility by processing all control signals and signaling using a more stable licensed band as an anchor. Furthermore, the technology can provide more improved mobile broadband experiences to users by securing a wider data pipe through extension to an unlicensed band.

In most of countries, transmission regulations for using an unlicensed band are designated because the unlicensed band is a shared band which may be used by any technology and device. In order to reduce interference between devices in the unlicensed band, transmit power of a device using the unlicensed band may be limited to a lower level than a licensed band.

Transmission regulations for a shared band, such as a license-exempt band or an unlicensed band, provide several types of methods in order to reduce signal interference between devices. For example, there is a method of limiting transmit power so that received power in a given distance is not a given value or more, a method of hopping a location on a time or frequency resource, a method of using only a given resource of all resources, or a method of limiting a signal so that the signal is transmitted when received power of the signal is smaller than a given value after listening to the signal from another device.

The existing cellular communication, such as LTE, requires a resource allocation procedure based on channel measurement and link adaptation for adaptively determining the transmission capacity of a transmission and reception link. In a shared band, such as an unlicensed band for which rules for coexistence between different communication systems have been regulated, however, several problems may occur in applying the existing resource an allocation scheme. Accordingly, there is a need for a new resource allocation scheme for communication using an unlicensed band.

DISCLOSURE OF INVENTION

Technical Problem

The disclosure provides a method and device for transmitting and receiving signals in a communication system.

The disclosure provides a method and device for providing reliable communication for an unlicensed/shared/mm-Wave band in which a resource for communication between devices is shared.

Solution to Problem

In accordance with an embodiment of the disclosure, there may be provided an operating method of a user equipment in a wireless communication system, including monitoring a synchronization signal transmitted by a base station based on a synchronization resource interval, receiving the synchronization signal based on the monitoring of the synchronization signal, and accessing the base station based on synchronization obtained from the synchronization signal, wherein the synchronization resource interval of synchronization signal transmission periodicity includes a plurality of synchronization signal transmission timings.

Furthermore, in accordance with an embodiment of the disclosure, there may be provided a user equipment, including a transceiver configured to transmit and receive signals and a controller configured to control to monitor a synchronization signal transmitted by a base station based on a synchronization resource interval, receive the synchronization signal based on the monitoring of the synchronization signal, and access the base station based on synchronization obtained from the synchronization signal, wherein the synchronization resource interval of synchronization signal transmission periodicity includes a plurality of synchronization signal transmission timings.

Furthermore, in accordance with an embodiment of the disclosure, there may be provided an operating method of a base station in a wireless communication system, including configuring a synchronization resource interval for transmitting a synchronization signal, performing listen before talk (LBT) based on the synchronization resource interval, and transmitting the synchronization signal in the synchronization resource interval based on a result of the execution of the LBT, wherein the synchronization resource interval of synchronization signal transmission periodicity includes a plurality of synchronization signal transmission timings.

Furthermore, in accordance with an embodiment of the disclosure, there may be provided a base station, including a transceiver configured to transmit and receive signals and a controller configured to control to configure a synchronization resource interval for transmitting a synchronization signal, perform listen before talk (LBT) based on the synchronization resource interval, and transmit the synchronization signal in the synchronization resource interval based on a result of the execution of the LBT, wherein the synchronization resource interval of synchronization signal transmission periodicity includes a plurality of synchronization signal transmission timings.

Advantageous Effects of Invention

In accordance with an embodiment of the disclosure, the method and device for providing reliable communication for an unlicensed/shared/mmWave band in a system in which a resource for communication between devices is shared can be provided.

MODE FOR THE INVENTION

Figure 1:
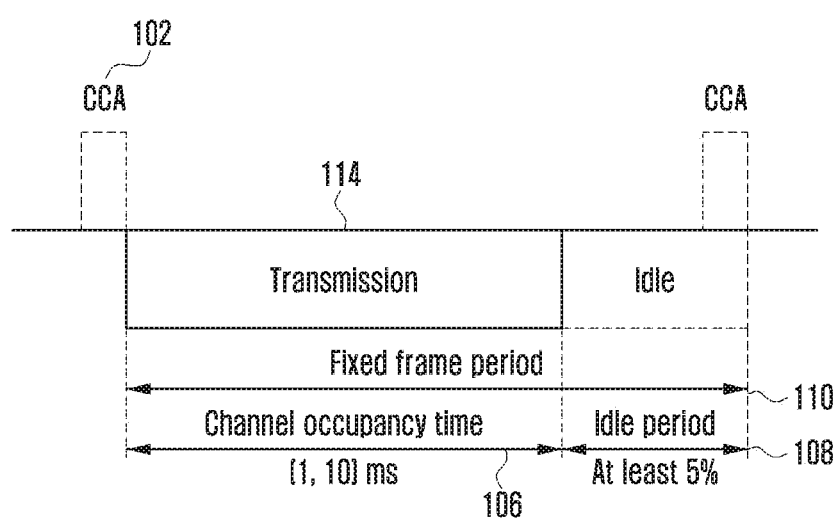
FIG. 1 is a diagram showing a communication procedure through an unlicensed band in the case of an FBE.

Hereinafter, embodiments of the disclosure are described in detail with reference to the accompanying drawings.

In describing the embodiments, a description of contents that are well known in the art to which the disclosure pertains and not directly related to the disclosure is omitted in order to make the gist of the disclosure clearer.

For the same reason, in the accompanying drawings, some elements are enlarged, omitted, or depicted schematically.

Furthermore, the size of each element does not accurately reflect its real size. In the drawings, the same or similar elements are assigned the same reference numerals.

The merits and characteristics of the disclosure and a method for achieving the merits and characteristics will become more apparent from the embodiments described in detail in conjunction with the accompanying drawings. However, the disclosure is not limited to the disclosed embodiments, but may be implemented in various different ways. The embodiments are provided to only complete the disclosure of the disclosure and to allow those skilled in the art to understand the category of the disclosure. The disclosure is defined by the category of the claims. The same reference numerals will be used to refer to the same or similar elements throughout the drawings.

In the disclosure, it will be understood that each block of the flowchart illustrations and combinations of the blocks in the flowchart illustrations can be executed by computer program instructions. These computer program instructions may be mounted on the processor of a general purpose computer, a special purpose computer, or other programmable data processing apparatus, so that the instructions executed by the processor of the computer or other programmable data processing apparatus create means for executing the functions specified in the flowchart block(s). These computer program instructions may also be stored in computer-usable or computer-readable memory that can direct a computer or other programmable data processing equipment to function in a particular manner, such that the instructions stored in the computer-usable or computer-readable memory produce an article of manufacture including instruction means that implement the function specified in the flowchart block(s). The computer program instructions may also be loaded on a computer or other programmable data processing apparatus to cause a series of operational steps to be performed on the computer or other programmable apparatus to produce a computer-executed process, so that the instructions performing the computer or other programmable apparatus provide steps for executing the functions described in the flowchart block(s).

Furthermore, each block of the flowchart illustrations may represent a portion of a module, a segment, or code, which includes one or more executable instructions for implementing a specified logical function(s). It should also be noted that in some alternative implementations, the functions noted in the blocks may occur out of order. For example, two blocks shown in succession may in fact be executed substantially concurrently, or the blocks may sometimes be executed in the reverse order, depending upon the functionality involved.

In this case, the term "unit", as used in the present embodiment means software or a hardware component, such as a field programmable gate array (FPGA) or an application-specific integrated circuit (ASIC), and the "unit" performs specific tasks. The "unit" may advantageously be configured to reside on an addressable storage medium and configured to operate on one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Furthermore, the components and "units" may be implemented to operate on one or more CPUs within a device or a security multimedia card.

In describing the embodiments of the disclosure in detail, a wireless communication system of a given channel structure is chiefly described, but a main gist to be claimed in this specification may be likewise applied to other communication systems and services having a similar technical background without greatly departing from the range disclosed in this specification, which may be determined by a person having skilled technical knowledge in a corresponding technical field.

Prior to a detailed description of the embodiments of the disclosure, some terms used in this specification are presented as examples of interpretable meanings. However, it is to be noted that the disclosure is not limited to the following interpreted examples.

A base station (BS) is an entity communicating with a terminal, and may be referred to as a BS, base transceiver station (BTS), NodeB (NB), eNodB (eNB), an access point (AP), etc. In particular, at least one of the following embodiments of the disclosure may be implemented in a heterogeneous network (HetNet) configured with a primary BS and a secondary BS. The primary BS may be referred to as a macro BS, a primary cell (PCell), etc. The secondary BS may be referred to as a small BS, a secondary cell (SCell), etc.

A user equipment is an entity communicating with a BS, and may be referred to as a UE, a device, a mobile station (MS), a mobile equipment (ME), a terminal, etc.

In a heterogeneous network, a UE may communicate with a PCell with respect to traffic sensitive to mobility, such as major system information, control signal transmission and reception, and voice, and may communicate with an SCell with respect to traffic whose instant data rate is important, such as data. In this case, the PCell may be configured as a licensed band, and the SCell may be configured as a shared band, that is, an unlicensed band. Alternatively, the PCell may be configured as a 6 GHz band or less, and the SCell may be configured as a 6 GHz band or more. An example of such a cellular communication system may be an LTE carrier aggregation (CA) system.

A UE within a base station area may be in a radio resource control (RRC) IDLE state or an RRC CONNECTED state.

RRC IDLE: the state in which a UE performs BS (or cell) selection, monitors a paging channel, and obtains system information (SI), but does not exchange data with a BS.

RRC CONNECTED: the state in which a UE carefully monitors a control channel and exchanges data with a BS through a data channel RRC CONNECTED is the state in which several measurement results of a BS and surrounding BSs are reported in order to help the scheduling of the BS.

A device using an unlicensed band is divided into a frame based equipment (FBE) or a load based equipment (LBE). A communication procedure of each device is described below.

FIG. 1 is a diagram showing a communication procedure through an unlicensed band in the case of an FBE.

Referring to FIG. 1, a transmitter needs to perform clear channel assessment (CCA) 102 for a minimum of 20 micro second (us) or more before it performs transmission 104 through an unlicensed band. The CCA 102 is an operation for the transmitter to determine whether a different device now uses the unlicensed band by measuring the size of interference. When the size of interference measured as a result of the CCA is a given value or more, the transmitter does not perform transmission. When the size of interference is less than the given value, the transmitter performs the transmission 104. The transmission 104 is initiated from the start point of a frame subsequent to the CCA period with a fixed frame period 110. If the transmitter performs CCA once, it may occupy (106) the unlicensed band from a minimum of 1 ms to a maximum of 10 ms. Thereafter, the transmitter has to be idle (108) without performing transmission during a minimum of 5% of the channel occupancy time (COT) 106. This is called an idle period 108. If, as a result of the execution of the CCA 102, it is determined that a different device now uses the unlicensed band, the transmitter may perform CCA again after a lapse of the fixed frame period 110.

Figure 2:
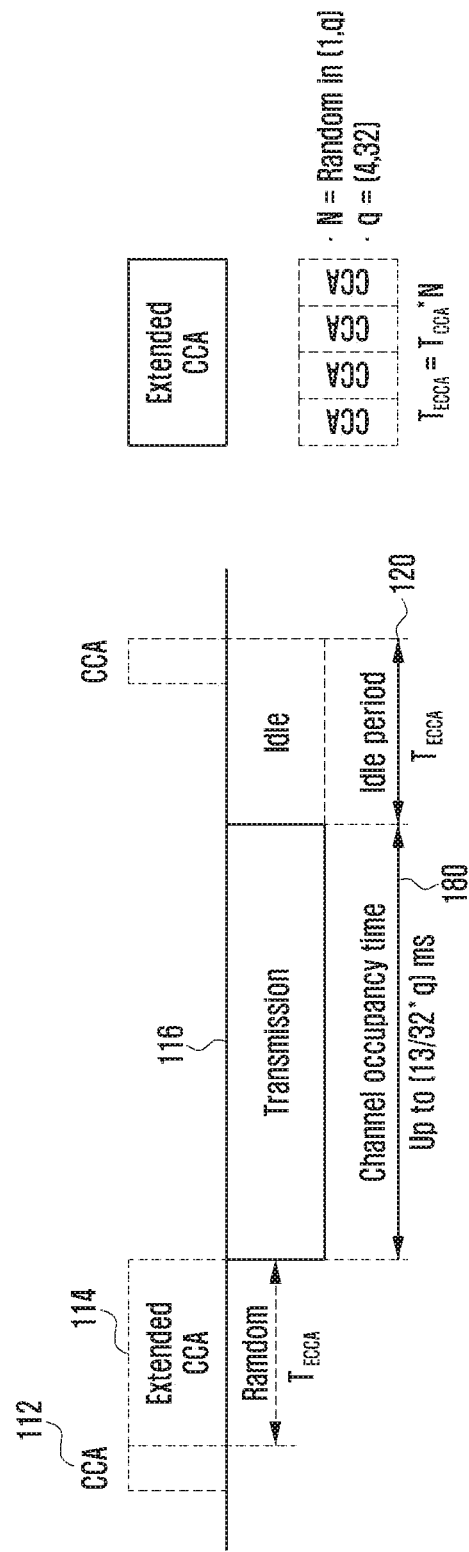
FIG. 2 is a diagram showing a communication procedure through an unlicensed band in the case of an LBE.

FIG. 2 is a diagram showing a communication procedure through an unlicensed band in the case of an LBE.

Referring to FIG. 2, like an FBE, a transmitter performs CCA 112 during a minimum of 20 us or more before it performs transmission 116 through an unlicensed band. If, as a result of the execution of the CCA 112, it is determined that there is no device now using the unlicensed band, the transmitter may perform the transmission. If it is determined that a different device now uses an unlicensed band, however, the transmitter may perform additional CCA 114 unlike in an FBE. This is called extended CCA (ECCA) 114. The ECCA 114 is configured with N CCAs. In this case, N is a backoff counter value randomly selected between [0, q], and q indicates a contention window size (CWS). The contention window size may be given by a base station or may be determined by a UE. If, as a result of the execution of the ECCA 114, it is determined that there is no device now using the unlicensed band, the transmitter performs the transmission 116. The time that the transmitter may occupy the unlicensed band, that is, a channel occupancy time 118, is a maximum of (13/32)*q ms. Thereafter, the transmitter may perform ECCA again. During the time when the ECCA is performed, the transmitter has an idle period 120.

An FBE and an LBE have advantages and disadvantages. First, from the viewpoint of the probability that an unlicensed band will be occupied, an LBE may have better performance than an FBE. The reason for this is that an FBE cannot perform CCA again during a fixed frame period if it fails in CCA once, but an LBE may perform an operation of occupying an unlicensed band by performing ECCA, that is, N-times additional CCAs, after it fails in CCA. Next, from the viewpoint of scheduling, that is, the transmission of a control channel, an FBE has an advantage in that it has simpler scheduling compared to an LBE. An FBE may use an unlicensed band based on a subframe boundary, that is, control channel transmission timing. However, an LBE cannot match start timing when an unlicensed band is used and a subframe boundary because it cannot randomly select N, that is, the CCA execution number of CCAs of ECCA. Accordingly, an LBE reserves some of a No. 1 subframe and performs the transmission of a control channel and data channel from a No. 2 subframe. Furthermore, an FBE gives less damage to a surrounding Wi-Fi device with which an unlicensed band is shared compared to an LBE. In general, an LBE has a high probability that it will occupy an unlicensed band compared to an FBE. The reason for this is that a Wi-Fi device takes a higher opportunity that it will occupy an unlicensed band. In the 3GPP standard, an FBE method is specified and called CAT2 LBT, and an LBE method is specified and called CAT4 LBT.

Meanwhile, although an unlicensed band is used, there is a need for a method for a UE to maintain access to a licensed band in order to provide reliable cellular communication service in a mobile environment. Accordingly, a possible data transfer rate can be improved by transmitting data sensitive to latency, such as voice, using a licensed band and transmitting data service using a licensed band and even an unlicensed band as opportunity permits.

[Method of Transmitting Strong Synchronization Signal]

Figure 3:
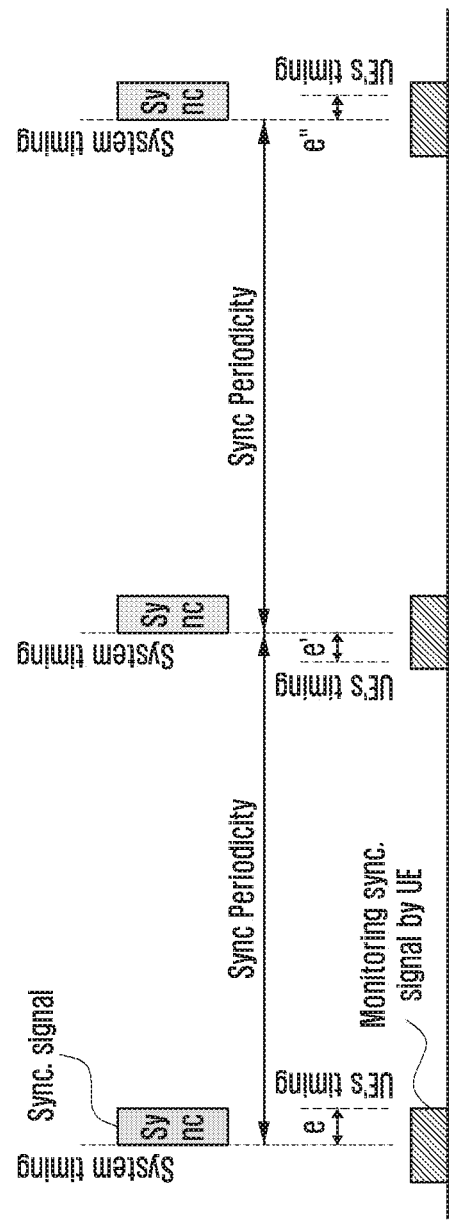
FIG. 3 is a diagram showing a synchronization signal transmission of a base station and a synchronization signal reception and tracking, and clock recovery procedure of a terminal in a mobile communication system.

FIG. 3 is a diagram showing a synchronization signal transmission of a base station and a synchronization signal reception and tracking, and clock recovery procedure of a terminal in a mobile communication system.

1) A base station periodically transmits a synchronization signal indicating an ID in a sequence form in general.

2) A UE performs a scanning procedure in order to detect one or more synchronization signals. The UE repeatedly performs an operation of receiving a synchronization signal, having the same ID in next periodicity, on the detected synchronization signal periodically.

3) In order to minimize a time/phase/frequency error between the oscillator (resonator) of the UE and the oscillator of the base station, the UE continues to receive a periodical synchronization signal and to correct the error.

Figure 4:
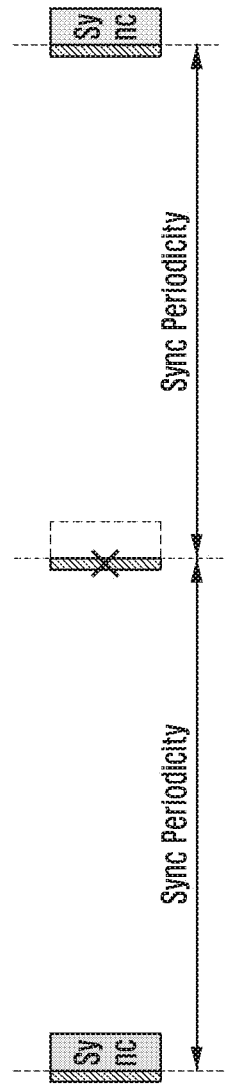
FIG. 4 is a diagram showing a method of transmitting a synchronization signal according to LBT.

FIG. 4 is a diagram showing a method of transmitting a synchronization signal according to LBT.

In an unlicensed band, a sensing (CCA) operation for listen-before-talk (LBT) is performed prior to reference timing before a synchronization signal is transmitted. Whether to transmit a synchronization signal is determined based on a result of the sensing operation. At given synchronization signal transmission timing, a base station may not transmit a synchronization signal due to an LBT failure. The base station that has not transmitted the synchronization signal may reattempt synchronization signal transmission with respect to the LBT in next synchronization signal transmission periodicity. However, if the base station does not transmit a synchronization signal during a given time, the UE also does not receive the synchronization signal. As a result, the degradation of communication performance is caused because a sync error gradually increases between the UE and the base station due to the drift of an oscillator embedded in the UE.

Accordingly, an embodiment of the disclosure is to reduce a sync error by enabling a base station to have a plurality of synchronization signal transmission opportunities within a given time. A synchronization resource interval having a plurality of synchronization signal transmission opportunities may be configured contiguously or discontinuously (periodically) with respect to a given time of synchronization signal periodicity. If a synchronization signal is transmitted in a sequence form, the synchronization signal periodicity and the synchronization resource interval may be pre-configured because a lot of information cannot be carried and transmitted. Alternatively, the synchronization signal periodicity and the synchronization resource interval information may be carried and transmitted on a broadcast channel (BCH) signal that may be received based on the location of a synchronization signal or an ID. A UE that has received the BCH may update the same information.

In an embodiment of the disclosure, a UE tracks the synchronization signals of one or more base stations while performing a cell selection or (re)selection operation. The UE performs a process of obtaining system information (SI) by receiving a connected broadcast channel (BCH) from a discovered synchronization signal. If the UE has not yet obtained system information with respect to any synchronization signal, it may apply a preset value, may apply a value set through another radio access technology (RAT) (e.g., LTE), or may apply a value set through a macro cell group (MCG) of a dual connectivity (DC) structure as the value of synchronization signal periodicity and synchronization resource interval information. The UE obtains system information with respect to a synchronization signal from a camping cell, and updates the existing set value with the proposed information (synchronization signal periodicity, synchronization resource interval) related to synchronization transmission included in system information.

In another embodiment of the disclosure, the valid time of the information related to synchronization transmission may be transmitted together in system information or a base station list that follows the information related to synchronization transmission may be transmitted together in system information. A UE may maintain a synchronization reception operation according to the information related to synchronization transmission until the valid time expires or when the UE identifies a valid base station included in the base station list.

In an embodiment of the disclosure, the existing LTE operation may be applied to some of the cell selection/reselection operation of a UE. In an unlicensed band operation according to an embodiment of the disclosure, the existing operation may be changed or a new configuration may be added for a synchronization method.

Figure 5A:
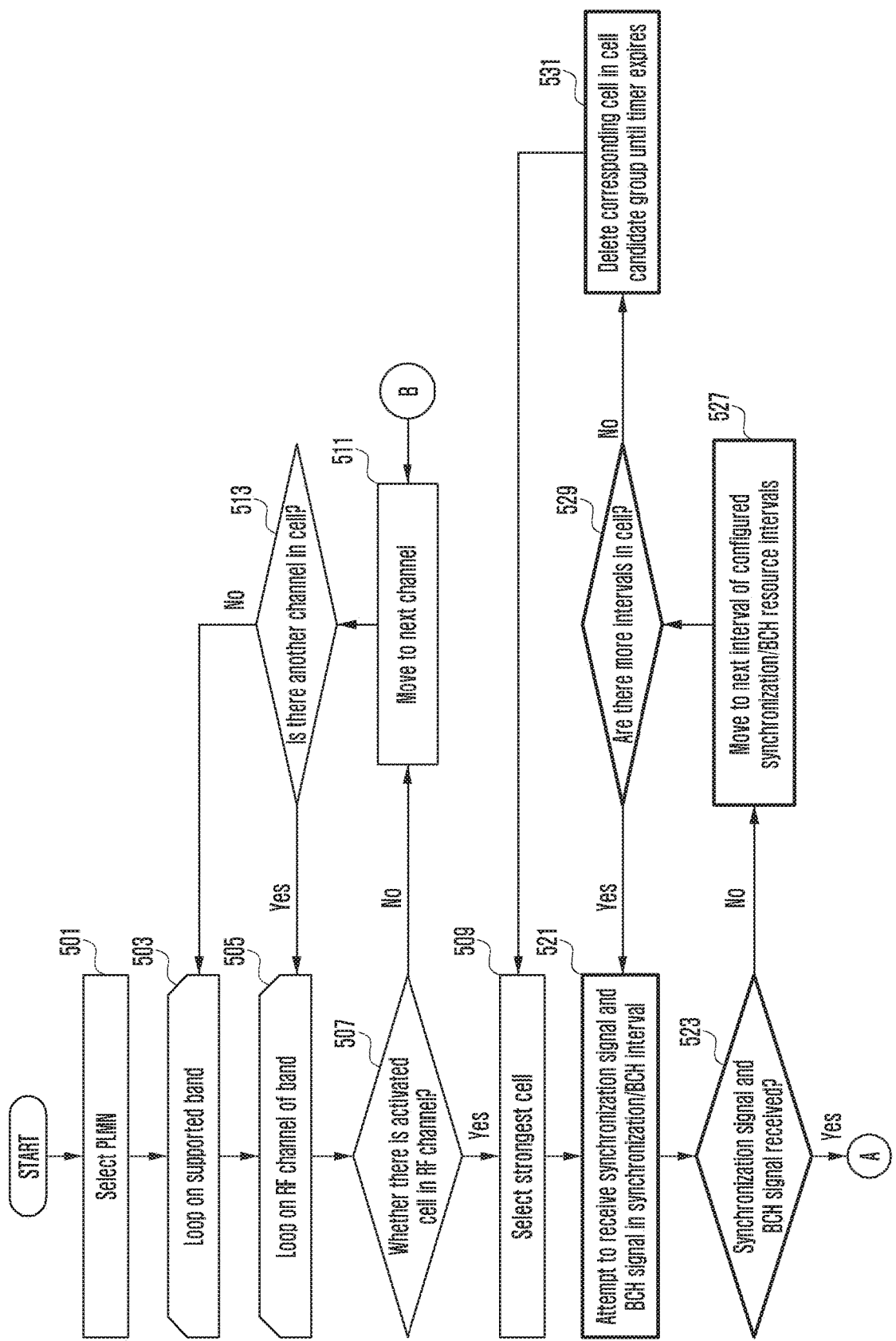
FIGS. 5A and 5B are diagrams showing a cell selection procedure when a synchronization signal and a BCH signal for SI transmission are transmitted together in one embodiment of the disclosure.
Figure 5B:
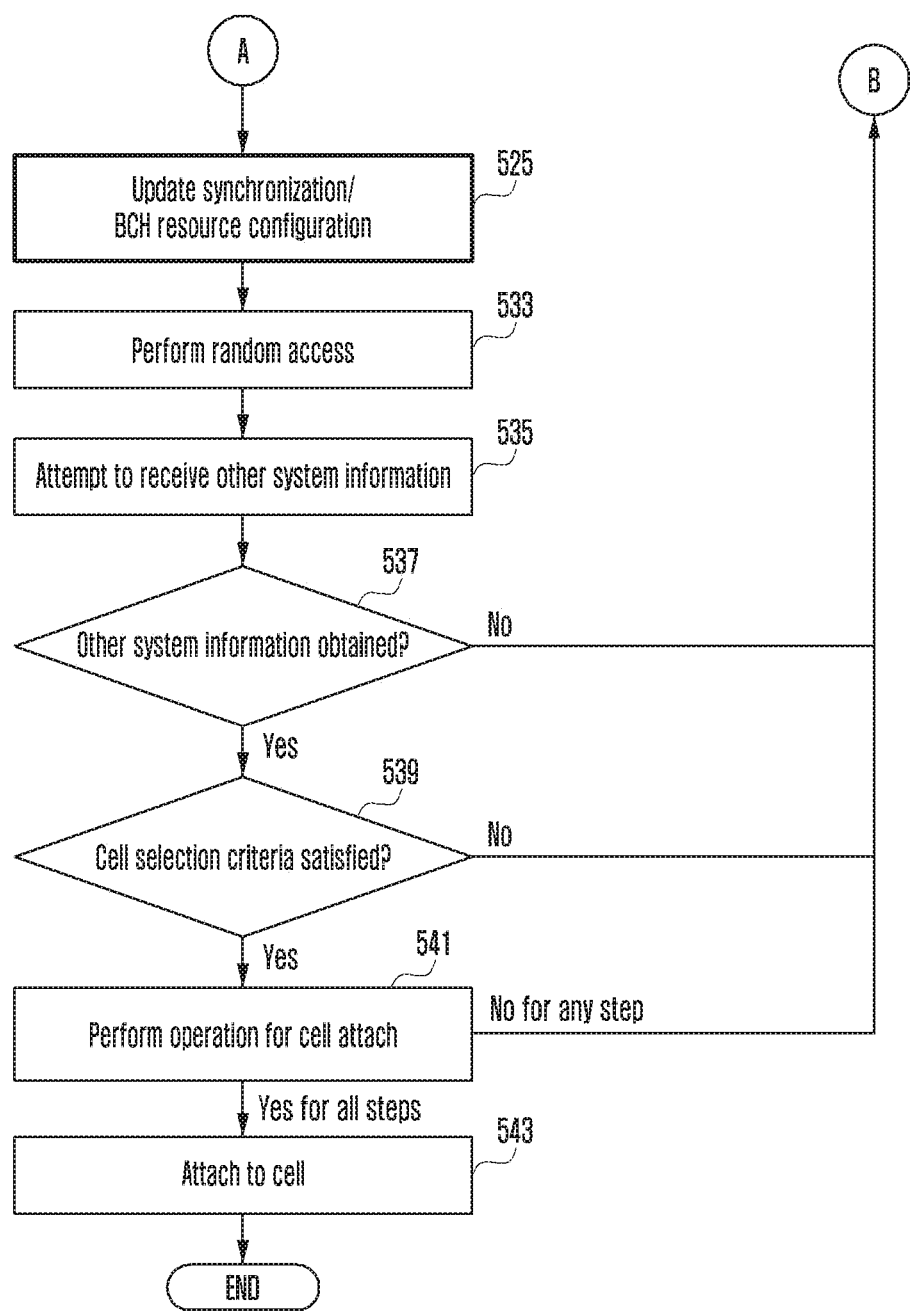

FIGS. 5A and 5B are diagrams showing a cell selection procedure when a synchronization signal and a BCH signal for SI transmission are transmitted together in one embodiment of the disclosure. Hereinafter, FIGS. 5A and 5B are collectively called FIG. 5.

In the embodiment of FIG. 5, a synchronization signal and a BCH signal for SI transmission may be transmitted together in a time axis or frequency axis.

At operation 501, a UE selects a public land mobile network (PLMN). At operation 503, the UE loops on a supported band. At operation 505, the UE loops on the radio frequency (RF) channel of the band.

At operation 507, the UE identifies whether there is an activated cell in the RF channel. The UE proceeds to operation 509 when an activated cell is present, and proceeds to operation 511 when an activated cell is not present. At operation 511, the UE moves to a next channel. Thereafter, at operation 513, the UE identifies whether a plurality of channels is present in a cell. The UE proceeds to operation 505 if a plurality of channels is present, and proceeds to operation 503 if not.

At operation 509, the UE selects a cell. The UE may select a cell that transmits the strongest signal. The UE that has received the cell proceeds to operation 521. At operation 521, the UE attempts the reception of a synchronization signal and BCH within a synchronization/BCH interval. At operation 523, the UE may identify whether a synchronization signal or a BCH has been received. The UE proceeds to operation 525 if a synchronization signal or a BCH has been received, and proceeds to operation 527 if a synchronization signal or a BCH has not been received.

The UE may attempt the reception within a configured synchronization/BCH resource interval. If the UE succeeds in the reception, at operation 525, the UE updates a corresponding configuration based on configuration information (at least one of a synchronization/BCH resource periodicity, time offset, frequency offset, carrier, synchronization/BCH resource interval, synchronization/BCH resource sub-interval) on a synchronization/BCH resource interval within SI. However, if the UE attempts the reception within a configured synchronization/BCH resource interval and fails in the reception, at operation 527, the UE moves to a next interval of configured synchronization/BCH resource intervals or moves to a next sub-interval of configured synchronization/BCH resource sub-intervals. The UE moves to a next interval or sub-interval and attempts synchronization and BCH reception. If, as a result of a determination at operation 529, a next interval or sub-interval for a movement is no longer present, at operation 531, the UE initiates a configured timer, and excludes a base station that is now monitored from a candidate base station list for cell selection/reselection until the timer expires.

At operation 533, the UE may perform a random access operation. The UE may perform the random access operation based on information received from the synchronization signal/BCH signal. If random access is already successful, timing advance information is valid or information of the UE does not need to be updated in a base station/network, operation 533 may be omitted. At operation 535, the UE may receive different system information. That is, the UE may obtain additional system information.

At operation 537, the UE may identify whether system information for cell selection has been obtained. The UE proceeds to operation 511 if the system information has not been obtained, and proceeds to operation 539 if the system information has been obtained. At operation 539, the UE identifies whether cell selection criteria are satisfied. For example, the UE may identify whether the cell selection criteria are satisfied based on additionally obtained system information. The UE proceeds to operation 541 when the criteria are satisfied, and proceeds to operation 511 when the criteria are not satisfied.

At operation 541, the UE may perform operations for attaching to a cell. For example, the UE may perform a procedure of identifying a suitable PLMN, a procedure of identifying a forbidden TA, a procedure of identifying a barred cell, an authentication procedure, etc.

If, as a result of the identification for attaching to a cell through the processes, a cell is a suitable cell, at operation 543, the UE may attach to the corresponding cell.

Figure 6A:
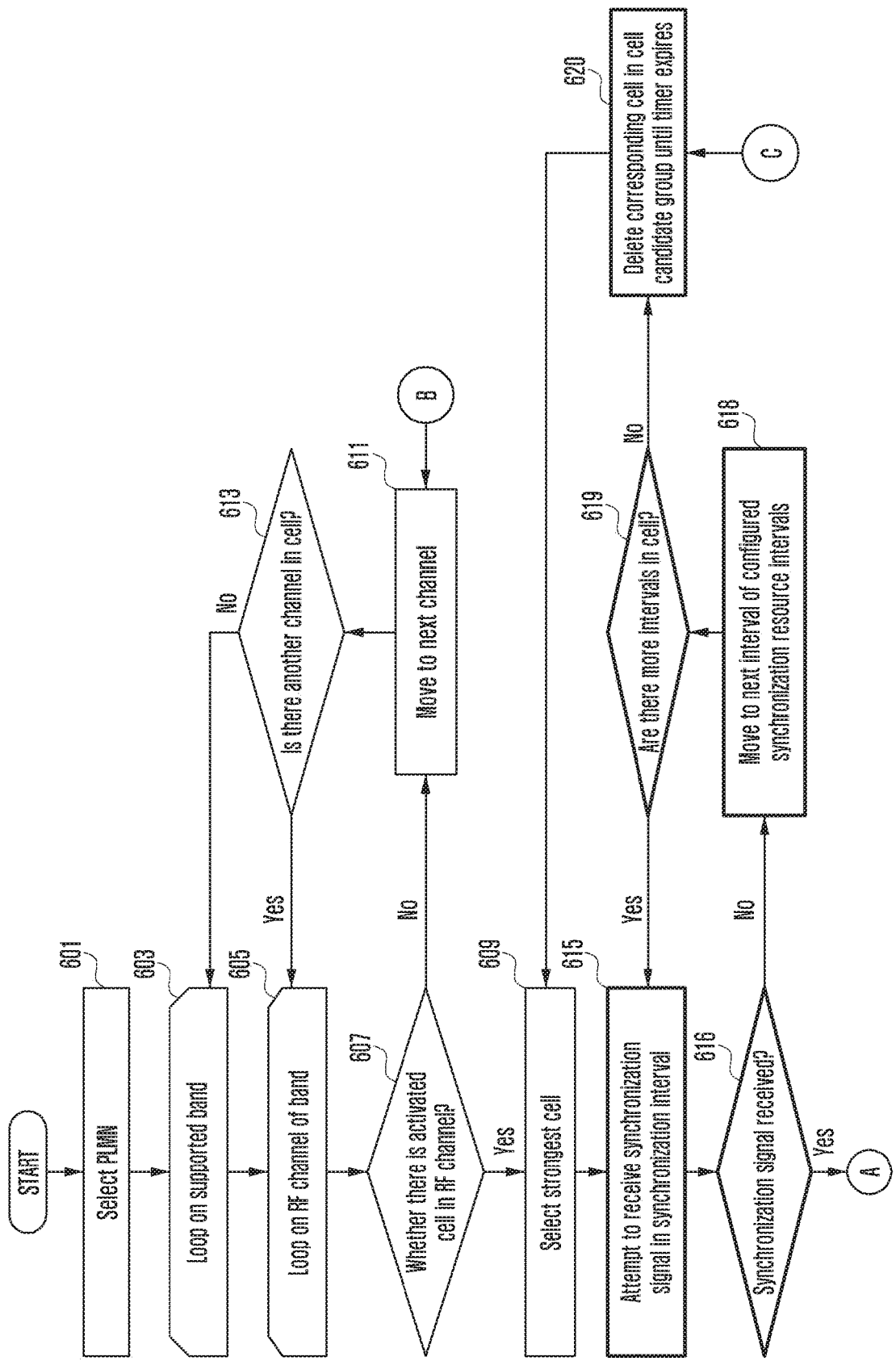
FIGS. 6A and 6B are diagrams showing a cell selection procedure when a synchronization signal and a BCH signal for SI transmission are separately transmitted in one embodiment of the disclosure.
Figure 6B:
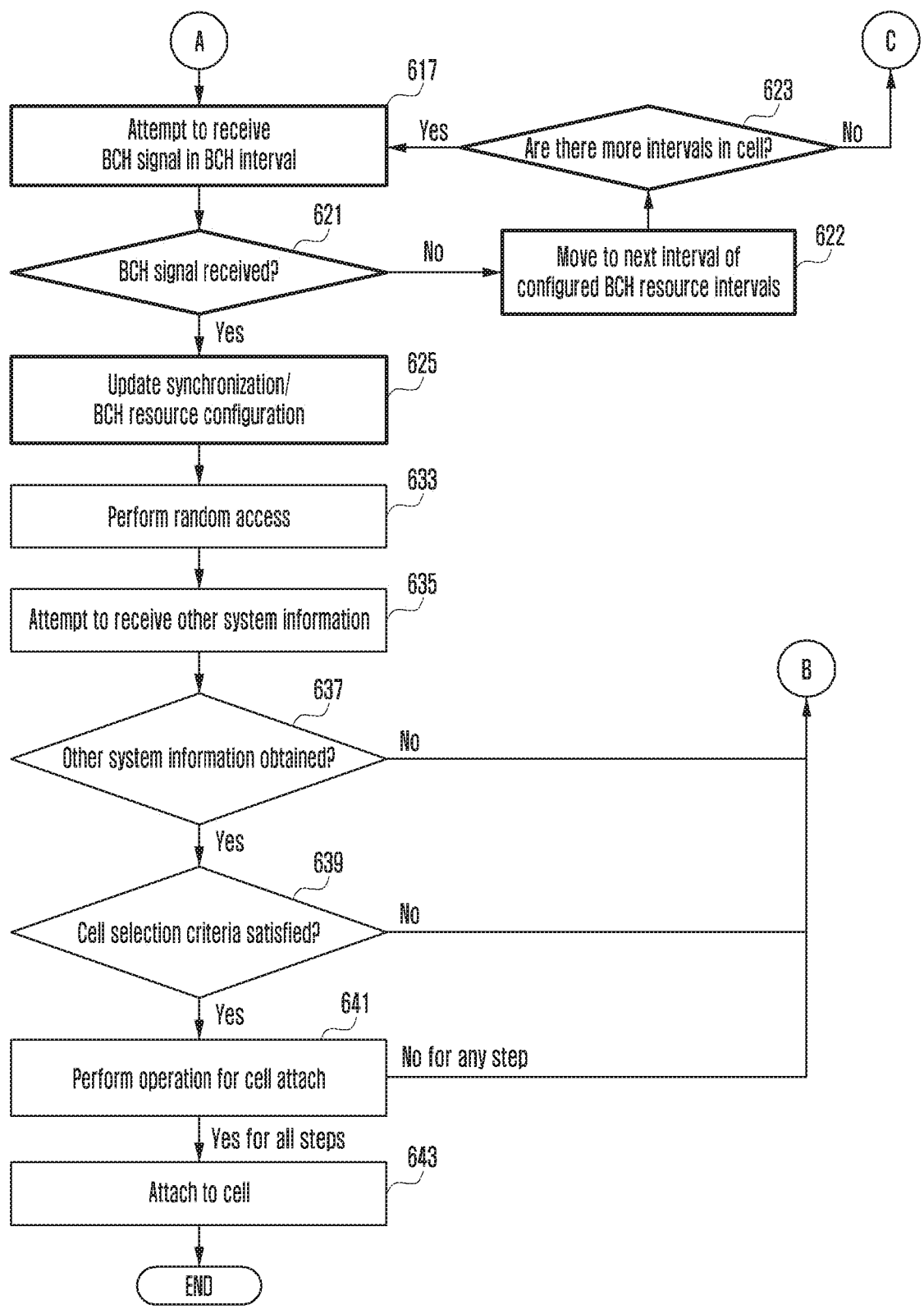

FIGS. 6A and 6B are diagrams showing a cell selection procedure when a synchronization signal and a BCH signal for SI transmission are separately transmitted in one embodiment of the disclosure. Hereafter, FIGS. 6A and 6B are collectively called FIG. 6.

In the embodiment of FIG. 6, a synchronization signal and a BCH signal for SI transmission may be separately transmitted in a time axis or frequency axis. At operation 601, a UE selects a public land mobile network (PLMN). At operation 603, the UE loops on a supported band. At operation 605, the UE loops on the radio frequency (RF) channel of the band.

At operation 607, the UE identifies whether an activated cell is present in the RF channel. The UE proceeds to operation 609 when an activated cell is present, and proceeds to operation 611 when an activated cell is not present. At operation 611, the UE moves to a next channel Thereafter, at operation 613, the UE identifies whether a plurality of channels is present in a cell. The UE proceeds to operation 605 if a plurality of channels is present, and proceeds to operation 603 if not.

At operation 609, the UE selects a cell. The UE may select a cell that transmits the strongest signal. The UE that has received the cell proceeds to operation 615. At operation 615, the UE attempts the reception of a synchronization signal within synchronization periodicity. At operation 616, the UE may identify whether a synchronization signal or a BCH has been received. The UE proceeds to operation 617 if a synchronization signal or a BCH has been received, and proceeds to operation 618 if a synchronization signal or a BCH has not been received.

When the UE attempts reception and succeeds in the reception within a configured synchronization resource interval, the UE proceeds to operation 617 and attempts SI reception within a configured BCH resource interval. However, when the UE attempts the reception and fails in the reception within a configured synchronization resource interval, at operation 618, the UE moves to a next interval of configured synchronization resource intervals or moves to a next sub-interval of configured synchronization resource sub-intervals. The UE moves to a next interval or sub-interval and attempts synchronization signal reception. If, as a result of a determination at operation 619, a next interval or sub-interval for a movement is no longer present, the UE proceeds to operation 620. The UE initiates a configured timer, excludes a base station that is now monitored from a candidate base station list for cell selection/reselection until the timer expires, and proceeds to operation 609 again and returns to a process of discovering the strongest cell.

The UE that has succeeded in synchronization signal reception proceeds to operation 617, and attempts BCH signal reception within a BCH resource interval configured for SI acquisition. At operation 621, the UE receives a BCH signal, and identifies whether SI has been obtained. The UE proceeds to operation 625 if SI has been obtained, and proceeds to operation 622 if SI has not been obtained.

The UE that has obtained SI by successfully receiving the BCH signal updates a corresponding configuration based on configuration information (at least one of synchronization/BCH resource periodicity, time offset, frequency offset, carrier, synchronization/BCH resource interval, synchronization/BCH resource sub-interval) on a synchronization resource interval within SI. However, when the UE attempts reception and fails in the reception within a configured BCH resource interval, at operation 622, the UE moves to a next interval of configured BCH resource intervals or moves to a next sub-interval of configured BCH resource sub-intervals. The UE moves to a next interval or sub-interval and attempts BCH signal reception. If, as a result of a determination at operation 623, a next interval or sub-interval for a movement is no longer present, the UE proceeds to operation 620. The UE initiates a configured timer, excludes a base station that is now monitored from a candidate base station list for cell selection/reselection until the timer expires, and returns to a process of discovering the strongest cell again.

In the embodiment of FIG. 6, according to a method, such as that described above, a base station may transmit a synchronization signal and system information separately in the frequency or time axis. A UE may separately perform operations of receiving a synchronization signal and system information. When the UE receives a synchronization signal, the UE may perform an operation of receiving system information, thereby being capable of improving efficiency.

At operation 633, the UE may perform a random access operation. The UE may perform the random access operation based on information received from the synchronization signal/BCH signal. If random access is already successful, timing advance information is valid or information of the UE does not need to be updated in a base station/network, operation 633 may be omitted. At operation 635, the UE may receive different system information. That is, the UE may obtain additional system information.

At operation 637, the UE may identify whether system information for cell selection has been obtained. The UE proceeds to operation 611 if the system information has been obtained, and proceeds to operation 639 if system information has not been obtained. At operation 639, the UE identifies whether cell selection criteria are satisfied. For example, the UE may identify whether cell selection criteria are satisfied based on additionally obtained system information. The UE proceeds to operation 541 when the criteria are satisfied, and proceeds to operation 611 when the criteria are not satisfied.

At operation 641, the UE may perform operations for attaching to a cell. For example, the UE may perform a procedure of identifying a suitable PLMN, a procedure of identifying a forbidden TA, procedure of identifying a barred cell, an authentication procedure, etc.

If, as a result of the identification for attaching to a cell through the processes, a cell is a suitable cell, at operation 643, the UE may attach to the corresponding cell.

Detailed operations related to the operations of FIGS. 5 and 6 are described more specifically below. Accordingly, each of the following operations may be applied to a corresponding operation of FIGS. 5 and 6.

A UE may apply a synchronization/BCH resource configuration default value in order to track a base station whose synchronization/BCH resource configuration information has not been previously updated in a cell selection target candidate base station list stored in memory. The UE obtains SI of a base station in a cell selection/reselection process and updates synchronization/BCH resource configuration information. The UE may start 1) a timer from the update timing of synchronization/BCH resource configuration information or 2) a timer from timing when a base station from which SI has been obtained no longer satisfies cell selection criteria. The UE maintains the updated synchronization/BCH resource configuration information until the started timer expires based on one of the timer start methods. When the timer expires, the UE returns the synchronization/BCH resource configuration information of the base station to a default value. The timer value and the start/expiration criteria may be configured as SI or an RRC message by a network/base station.

The base station may change a synchronization/BCH resource interval as follows as information of a synchronization/BCH resource interval is updated. The resource block number default value of the resource interval is Nd, a changed value is Nu, and Nu is greater than Nd. The base station operates based on one of the following changed methods.

A) A method for extending a resource interval [0, 1, ..., Nd−1] according to a default value to [0, 1, ..., Nu−1] without changing a start point B) A method for extending a resource interval [0, 1, ..., Nd−1] according to a default value to [Nd−Nu, Nd−Nu+1, ..., Nd−1] by advancing a start point as much as (Nu−Nd)×[resource block length]

C) A method for extending a resource interval [0, 1, ..., Nd−1] according to a default value to [Nmax−Nu, Nmax−Nu+1, ..., Nmax−1] by advancing a start point as much as (Nu−Nmax)×[resource block length]

Figure 7:
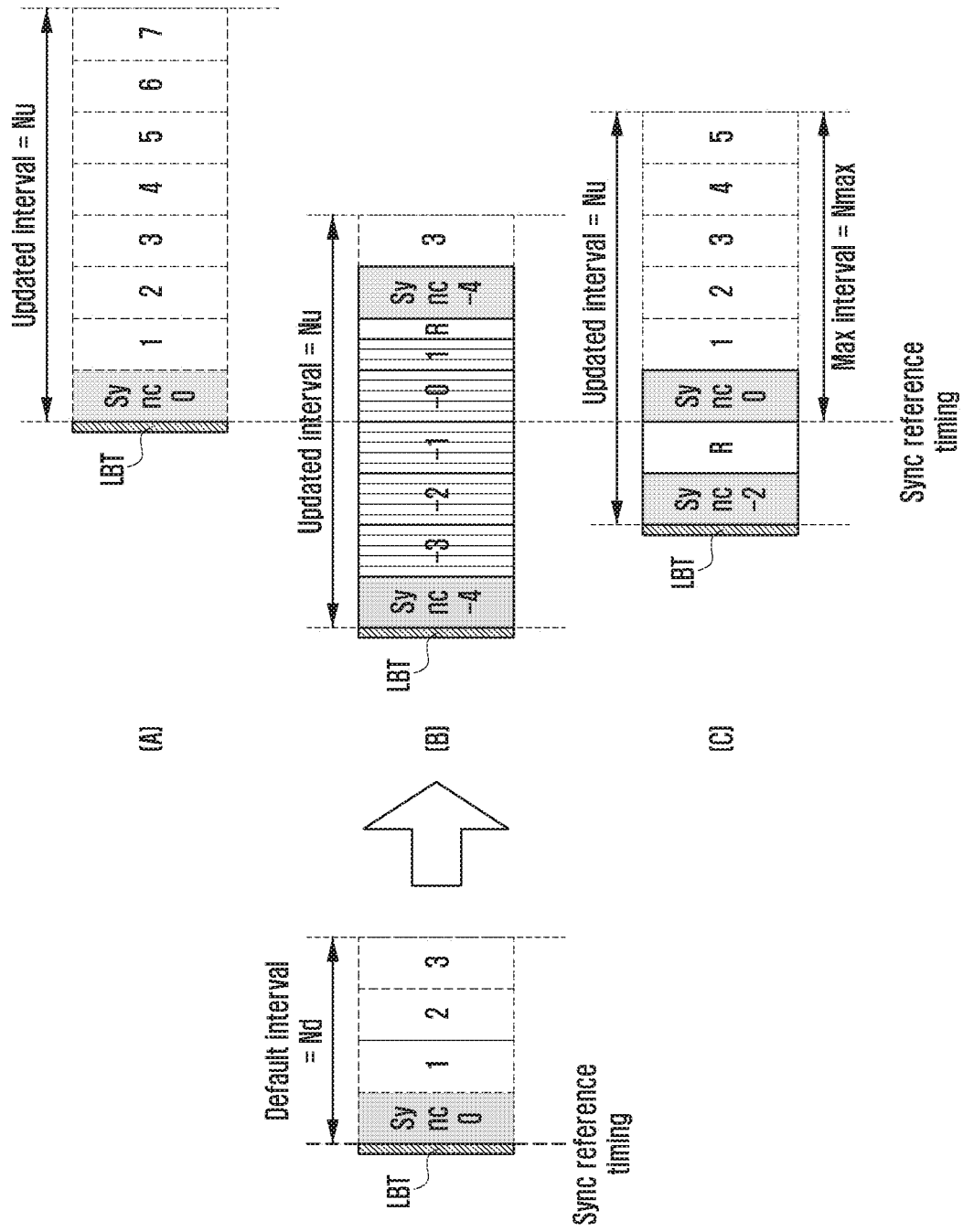
FIG. 7 is a diagram showing a method of changing a synchronization signal transmission interval according to an embodiment of the disclosure.

FIG. 7 is a diagram showing a method of changing a synchronization signal transmission interval according to an embodiment of the disclosure. A method of changing a synchronization signal transmission interval is described with reference to FIG. 7.

In FIGS. 7, (A), (B), and (C) correspond to methods A, B, and C, respectively.

A UE needs to be pre-configured or configured by a base station and to be aware that it will operates according to which one of the methods A, B, and C. The UE operates to calculate the start and length of a synchronization/BCH resource interval using a configured method of the methods A, B, and C and to receive a synchronization/BCH signal during the interval. In particular, in the methods B) and C), the base station needs to make an effort to transmit synchronization to a UE operating based on a default value (UE operating according to a default interval). The UE operating according to the default interval may not receive a synchronization signal transmitted prior to timing when the default interval starts, and thus the base station may transmit a synchronization signal again within the default interval. For example, in the case of B), the base station may perform LBT and transmit a synchronization signal based on a result of the execution of the LBT. The base station has already succeeded in the synchronization signal transmission in a synchronization resource [−4], but performs ECCA or Long LBT in order to transmit a synchronization signal again during a synchronization resource [0, 1, 2, 3]. In FIG. 7, sync shows that a synchronization signal is transmitted. FIG. 7(B) shows an operation for a base station to transmit a reservation signal when an ECCA result backoff value N is 0 and to transmit a synchronization signal in synchronization with a synchronization resource block 2. In FIG. 7, R shows a configuration in which a reservation signal is transmitted. For another example, C) shows an operation in which a base station has already succeeded in synchronization signal transmission in a synchronization resource [−2], but transmits a reservation signal without stopping signal transmission in order to transmit a synchronization signal again and transmits a synchronization signal in synchronism with a synchronization resource block 0 when a default synchronization resource interval is reached. Through such a method, a base station may configure, update the period or timing in which a synchronization signal is transmitted, and a UE may configure, update the period or timing in which a synchronization signal is received.

In an embodiment of the disclosure, although a UE has not received a synchronization signal from a base station at reference timing when the synchronization signal is transmitted, that is, the start timing of a synchronization resource interval, the UE additionally attempts to observe, monitor, receive a synchronization signal of the base station with respect to a plurality of synchronization signal transmission opportunities within a synchronization resource interval. If the UE does not repeatedly detect a synchronization signal within a synchronization resource interval and thus synchronization performance is degraded, the UE may give up the tracking of the synchronization signal and switch to an operation of detecting another synchronization signal. When the UE succeeds in the detection of a delayed synchronization signal within a synchronization resource interval, the UE may calculate reference timing based on location information included in the synchronization signal (i.e., what place has the synchronization signal been transmitted within the synchronization resource interval or what place has the synchronization signal been transmitted in a time unit compared to synchronization reference timing). In order to transmit a synchronization signal to location information, a partial set of the IDs of the existing synchronization signals needs to be defined as location information associated with a given synchronization signal ID. For example, the partial set may be configured as the same set based on a result obtained by performing modular operation using a synchronization signal ID as 4 and the quotient divided by 4. For example, if [0, 1, 2, 3] is configured as a first set and [4, 5, 6, 7] is configured as a second set, a base station that transmits a No. 0 synchronization signal ID at the first synchronization signal location of a synchronization resource interval transmits a No. 1 synchronization signal ID at the second synchronization signal location and transmits a No. 2 synchronization signal ID at the third synchronization signal location. Although a UE has received any synchronization signal ID of [0, 1, 2, 3], the UE understands that reference timing is based on the No. 0 synchronization signal and also understands that the synchronization signals are located within the synchronization resource interval in order of [0, 1, 2, 3]. The synchronization signal ID may be differently called a synchronization signal index, a synchronization slot index, a synchronization block index, a synchronization timing index, etc. Furthermore, if the unit of a synchronization resource block is configured in a UE, it may be represented as the index of a synchronization resource block unit. If such a unit is not provided to the UE, the location of a synchronization resource needs to be configured based on the unit of a symbol, slot, a subframe, frame, etc., that is, the time unit of a system.

Figure 8:
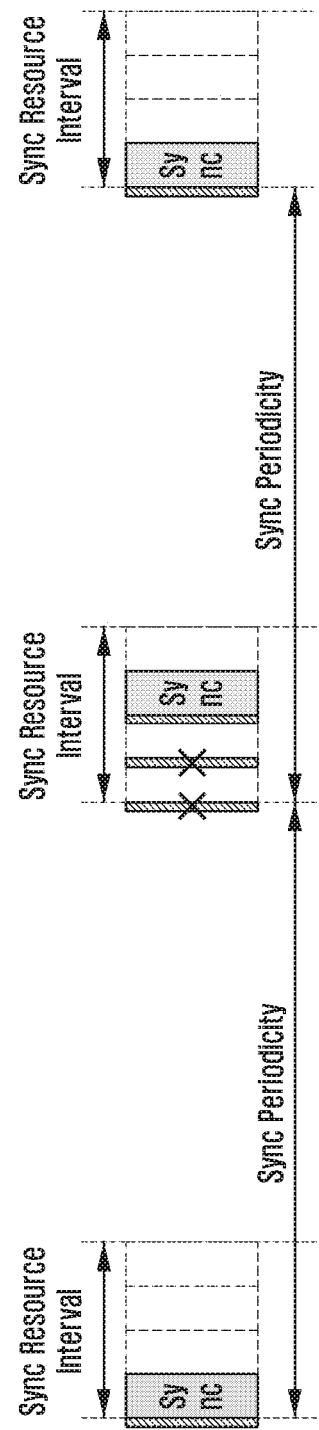
FIG. 8 is a diagram showing a method of configuring a synchronization resource interval and transmitting a synchronization signal according to LBT in one embodiment of the disclosure.

FIG. 8 is a diagram showing a method of configuring a synchronization resource interval and transmitting a synchronization signal according to LBT in one embodiment of the disclosure.

Sync periodicity may be an interval of a synchronization resource interval. A synchronization resource interval may include a plurality of synchronization signal transmission timings. A synchronization signal transmission timing within a synchronization resource interval may be identified as a synchronization signal resource location.

FIG. 8 shows the LBT of a UE and a synchronization signal transmission operation in a synchronization resource interval configured to be repeated every sync periodicity [0, 1, 2, 3]. A base station may previously perform LBT (e.g., short LBT) at each synchronization signal resource location, and may immediately transmit a synchronization signal when LBT within a synchronization resource interval is successful. For example, in the first synchronization resource interval of FIG. 8, a base station may determine that the transmission of a synchronization signal is possible based on a result of the execution of previous LBT at a first synchronization signal resource location, and may transmit a synchronization signal in the first interval of the synchronization resource interval. In a second synchronization resource interval of FIG. 8, the base station has sequentially performed LBTs previously at the first synchronization signal resource location and a second synchronization signal resource location, and has failed in the LBTs. The base station performs LBT previously at a third synchronization signal resource location, has determined that the transmission of a synchronization signal through the LBT, and may transmit a synchronization signal in the third interval of the synchronization resource interval.

A UE attempts to receive each synchronization signal resource within a synchronization resource interval preconfigured or configured by a base station/network. If the UE does not receive a synchronization signal within the synchronization resource interval, it considers that it has failed in the reception of a synchronization signal within this sync periodicity. In performing quality measurement on a synchronization signal, a UE 1) may not input a quality value, 2) may input a quality value by substituting it with the last successful quality value, 3) may input a quality value by substituting it with a quality value of the first successful synchronization signal after a failure, or 4) may input a quality value by substituting it with the mean value of the last successful quality value and a quality value of the first successful synchronization signal after a failure, when the UE averages or filters a quality value of the failed synchronization signal.

Figure 9:
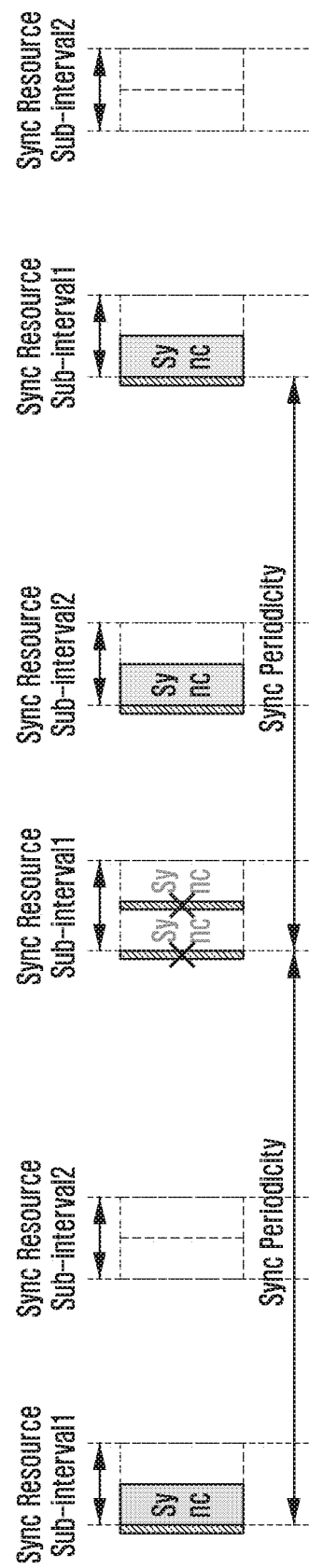
FIG. 9 is a diagram showing a method of configuring a synchronization resource interval and transmitting a synchronization signal according to LBT in another embodiment of the disclosure.

FIG. 9 is a diagram showing a method of configuring a synchronization resource interval and transmitting a synchronization signal according to LBT in another embodiment of the disclosure.

FIG. 9 shows the LBT of a UE and a synchronization signal transmission operation in a synchronization resource interval configured so that a plurality of synchronization resource sub-intervals is repeated every sync periodicity. Synchronization resource indices of [0, 1, 2, 3] have been configured with respect to the entire synchronization resource interval, but contiguous synchronization signal resources are actually separated for each sub-interval. Accordingly, a synchronization resource sub-interval 1 includes a synchronization signal resource of [0, 1], and a synchronization resource sub-interval 2 includes a synchronization signal resource of [2, 3]. Actually transmitted information may be 1) [0, 1] [2, 3] because only a synchronization signal ID is transmitted or may be 2) {1} [0, 1], {2} [0, 1] because a synchronization resource sub-interval ID and a synchronization signal ID are combined and transmitted. In the case of 1), the number of synchronization signal resources within one synchronization resource sub-interval needs to be pre-configured by a UE or by a base station/network. In the case of 1) and 2), the start location of each synchronization resource sub-interval (or the interval of a sub-interval start location) needs to be pre-configured in a UE or needs to be pre-configured by a base station/network in a subframe or frame unit. If information on the location or length of a synchronization resource sub-interval is configured by a base station/network, it may be transmitted as BCH or system information.

In the embodiment of FIG. 9, in a first synchronization resource interval, a synchronization signal may be transmitted in the first interval of the sub-interval 1 because the synchronization signal can be transmitted as a result of the execution of LBT prior to the first interval. In a second synchronization resource interval, LBT has been performed in a sub-interval 1, but synchronization signal transmission is not possible. The base station performs LBT again in a sub-interval 2, and may transmit a synchronization signal in the first interval of the sub-interval 2 because synchronization signal transmission is possible as a result of the execution the LBT. Although not shown, a synchronization signal and a BCH may be transmitted together depending on the configurations of a base station and a UE.

Various methods and procedures of the transmission and reception of a synchronization signal based on the synchronization resource interval, the synchronization resource sub-interval, and the synchronization signal block may be hereinafter applied to a case where synchronization and a BCH are transmitted together or a case where only a BCH is transmitted in other embodiments.

Figure 10:
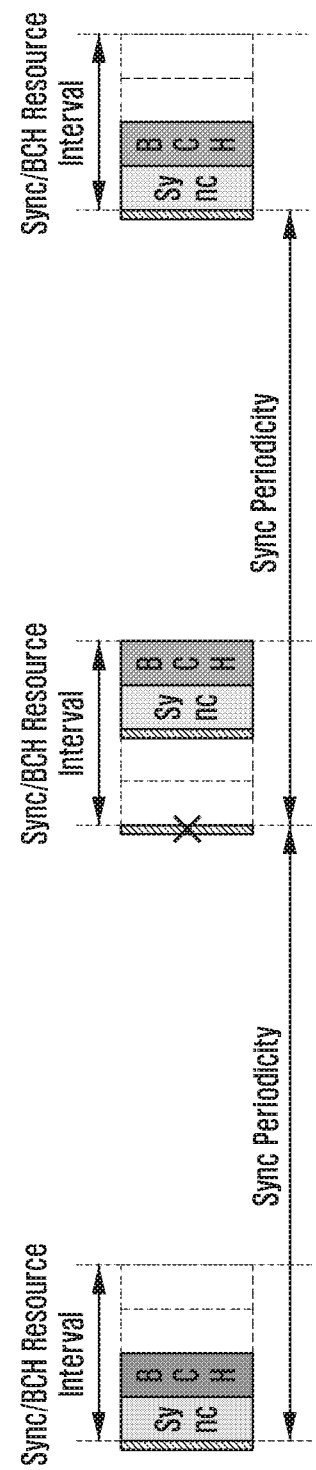
FIG. 10 is a diagram showing the configuration of a synchronization/BCH resource interval and the transmission of a synchronization signal and BCH according to LBT in one embodiment of the disclosure.

FIG. 10 is a diagram showing the configuration of a synchronization/BCH resource interval and the transmission of a synchronization signal and BCH according to LBT in one embodiment of the disclosure.

If a separate LBT is performed to transmit a synchronization signal and a BCH in an unlicensed band that requires LBT, an unnecessary UE operation may be caused. For example, if a BCH is not transmitted although synchronization signal transmission is successful, a UE cannot be successful in BCH reception subsequent to synchronization signal reception. Accordingly, in terms of the synchronization performance aspect, it is suitable to transmit a synchronization signal and a BCH together when one LBT is successful. As in LTE, if both a synchronization signal (primary synchronization signal (PSS)/secondary synchronization signal (SSS)) and a BCH are transmitted in the center 6 RBs of a frequency resource, the synchronization signal and the BCH may be transmitted temporally contiguously as in FIG. 10. The interval in which a synchronization signal and a BCH are transmitted together may be defined as a synchronization signal/BCH resource interval.

FIG. 10 shows a case where a resource for transmitting a synchronization signal and a resource for transmitting a BCH signal are configured as a set. If a synchronization signal can be transmitted as a result of LBT, a base station may transmit the synchronization signal and a BCH signal. In a first synchronization resource interval of FIG. 10, a base station may transmit a synchronization signal and a BCH signal together because the transmission of the synchronization signal is possible as a result of LBT. In a second synchronization resource interval of FIG. 10, the base station may transmit a synchronization signal and a BCH signal together because a synchronization signal cannot be transmitted as a result of the first LBT and a synchronization signal can be transmitted as a result of the second LBT. To transmit a synchronization signal and a BCH signal together may mean that a synchronization signal and a BCH are transmitted temporally contiguously and may mean that a BCH signal may be transmitted after an interval that does not require pre-configured additional LBT after a synchronization signal is transmitted. Furthermore, to transmit a BCH using the transmission of a synchronization signal as a precondition may be interpreted as transmitting a synchronization signal and a BCH signal together.

Figure 11:
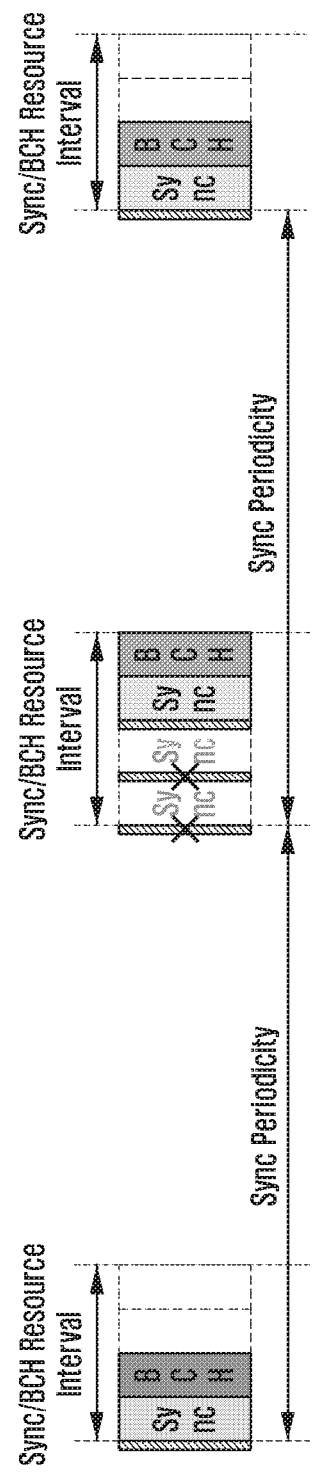
FIG. 11 is a diagram showing the configuration of a synchronization/BCH resource interval and the transmission of a synchronization signal and BCH according to LBT in another embodiment of the disclosure.

FIG. 11 is a diagram showing the configuration of a synchronization/BCH resource interval and the transmission of a synchronization signal and BCH according to LBT in another embodiment of the disclosure.

If the location where a synchronization signal and a BCH are transmitted is not fixed within a synchronization signal/BCH resource interval and the transmission of only a synchronization signal is attempted according to LBT and successful in order to efficiently transmit a signal, a method of subsequently transmitting a BCH may operate like FIG. 11. In the embodiment of FIG. 11, a resource for transmitting a synchronization signal and a signal for transmitting a BCH signal are not configured as a set. First, the interval in which the synchronization signal may be transmitted is configured, and a base station identifies whether the synchronization signal can be transmitted by performing LBT prior to each interval. If the transmission of the synchronization signal is possible, the base station may transmit a BCH at timing after the synchronization signal is transmitted. The resource in which the synchronization signal is transmitted and the resource in which the BCH signal is transmitted are not pre-configured, but the relation between the transmission of the synchronization signal and the transmission of the BCH signal is the same as that described with reference to FIG. 10.

In a first synchronization interval of FIG. 11, a base station transmits a synchronization signal and transmits a BCH signal because the synchronization signal can be transmitted as a result of LBT. In a second synchronization interval of FIG. 11, the base station cannot transmit a synchronization signal as a result of the execution of a first LBT and cannot transmit a synchronization signal as a result of the execution of a second LBT. The base station transmits a synchronization signal and transmits a BCH signal in a corresponding resource because the synchronization signal can be transmitted as a result of a third LBT.

In accordance with this method, lesser resources may be used compared to the method of FIG. 10 if more LBT opportunities are obtained within the same synchronization signal/BCH resource interval or LBT has the same opportunity. That is, in the embodiment of FIG. 10, if the same time resource is used, an opportunity to perform LBT or transmit a synchronization signal is small because synchronization signal transmission and BCH transmission resources are configured as a set. In contrast, in the embodiment of FIG. 11, if resources for a synchronization signal and a BCH are not managed as a set and the synchronization signal can be transmitted, an opportunity to perform LBT and transmit the synchronization signal is increased because the BCH is transmitted at timing after the synchronization signal is transmitted.

Figure 12:
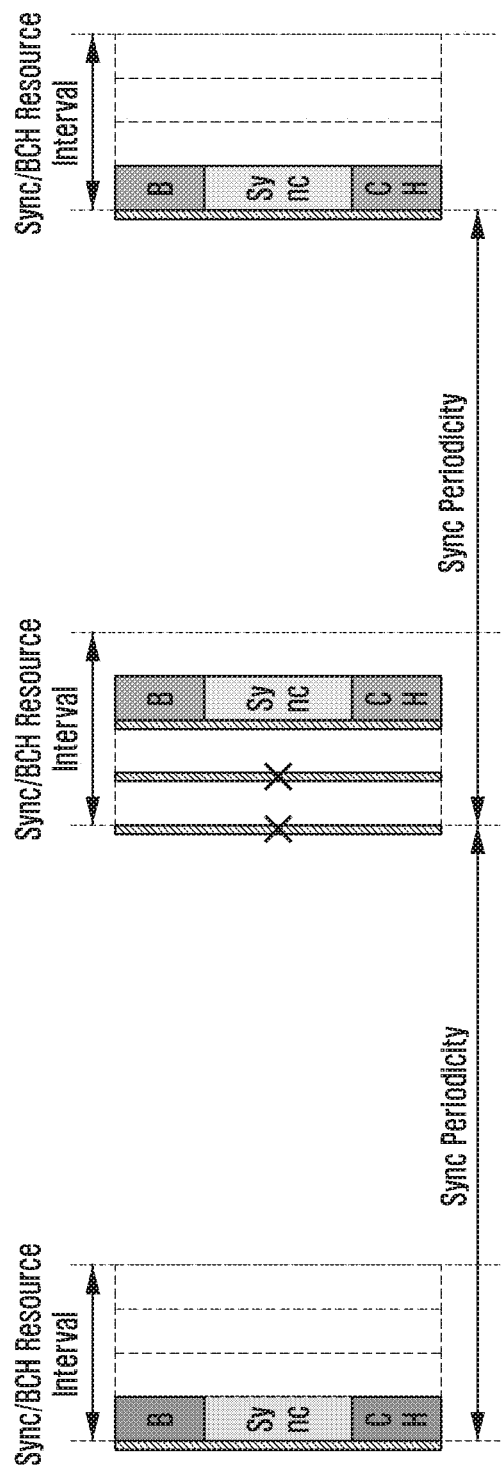
FIG. 12 is a diagram showing the configuration of a synchronization/BCH resource interval and the transmission of a synchronization signal and BCH according to LBT in another embodiment of the disclosure.

FIG. 12 is a diagram showing the configuration of a synchronization/BCH resource interval and the transmission of a synchronization signal and BCH according to LBT in another embodiment of the disclosure.

Unlike in LTE, in 5G, a synchronization signal and a BCH may be multiplexed and transmitted in a frequency axis. In this case, this may be indicated as in FIG. 12. In FIG. 10 or 11, time resources necessary for a synchronization signal/BCH resource interval can be reduced compared to a case where a synchronization signal and a BCH are transmitted temporally contiguously. In a first synchronization resource interval of FIG. 12, a base station may multiplex and transmit a synchronization signal and a BCH signal because the synchronization signal can be transmitted as a result of the execution of previous LBT at a first synchronization signal resource location. In a second synchronization resource interval of FIG. 12, the base station may multiplex and transmit a synchronization signal and a BCH signal because a synchronization signal cannot be transmitted as a result of the execution of previous LBT at a first synchronization signal resource location and second synchronization signal resource location and a synchronization signal can be transmitted as a result of the execution of LBT at a third synchronization signal resource location. In this case, a synchronization signal and a BCH signal may be transmitted together only when all of one or more LBT operations are successful in a full band for transmitting the synchronization signal and BCH signal.

If information, such as sync periodicity or a synchronization resource interval length, has not been pre-configured, a base station may notify a UE of information on a synchronization resource interval through a BCH as in FIGS. 10 to 12. A UE that has ever received the BCH of the base station additionally monitors a synchronization signal of the base station within a synchronization resource interval although it has obtained information on a synchronization resource interval, but has not received a synchronization signal of the base station at reference timing when a synchronization signal is transmitted. If synchronization performance is degraded because the UE does not repeatedly detect a synchronization signal within a synchronization resource interval, the UE may give up tracking and switch to an operation of detecting another synchronization signal. Information on a synchronization resource interval may be at least one of system reference timing, sync periodicity, the length of a synchronization resource interval, the start location (offset) of a synchronization resource interval.

More specifically, the existing periodicity of a synchronization signal is substituted with the periodicity of an interval having a synchronization signal transmit unit or the periodicity of a synchronization signal resource interval in the disclosure. The start time of this interval follows fixed periodicity, but the length of the interval may be configured as a given value in order to provide a plurality of synchronization signal transmission opportunities. As described in FIGS. 5 and 6, in general, a UE can identify a basic time and system information necessary for one cell (or cell group, virtual cell, hyper cell or central unit) access only when a base station transmits a broadcast channel (BCH) subsequent to a synchronization signal and a UE receives a master information block (MIB) or a system information block (SIB) through the BCH. Accordingly, the configuration and operation of a synchronization signal resource interval may be expanded to a synchronization signal and BCH resource interval. Meanwhile, if a synchronization signal resource interval is used in common with a BCH resource interval, this may be called a synchronization and BCH resource interval. When an MIB/SIB is transmitted through a BCH, the length/cycle/offset information of a synchronization and BCH resource interval may be transmitted.

Figure 13:
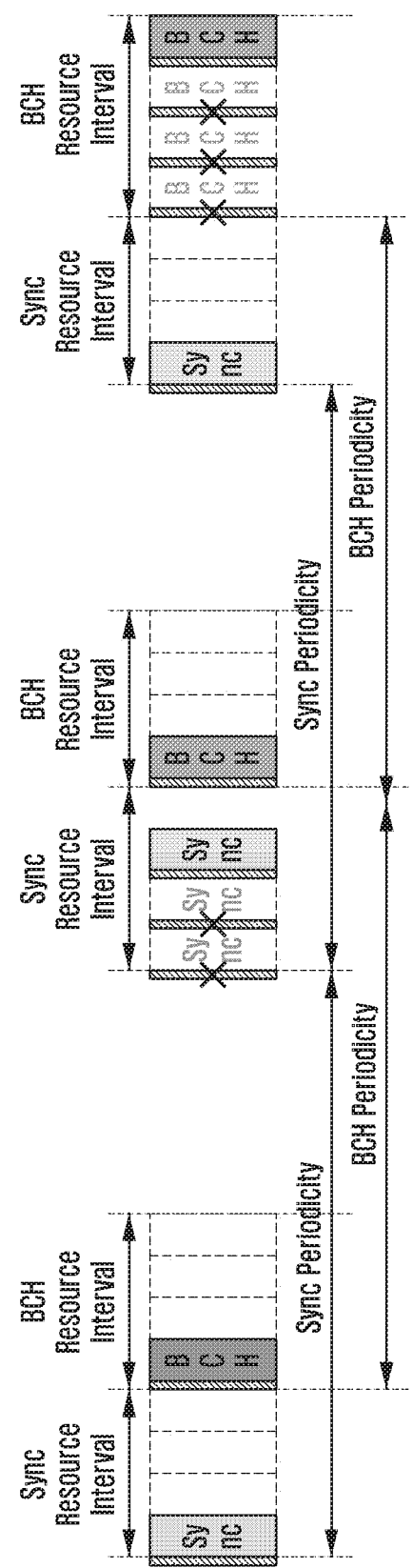
FIG. 13 is a diagram showing the configuration of a synchronization resource interval and BCH resource interval and the transmission of a synchronization signal and BCH according to LBT in one embodiment of the disclosure.

FIG. 13 is a diagram showing the configuration of a synchronization resource interval and BCH resource interval and the transmission of a synchronization signal and BCH according to LBT in one embodiment of the disclosure.

Meanwhile, if a synchronization signal and a BCH are not multiplexed and contiguously transmitted in a frequency size, the stability of a system can be improved by increasing the length of a synchronization signal and BCH resource interval because BCH transmission may fail although synchronization signal transmission is successful as in FIG. 13.

Figure 14:
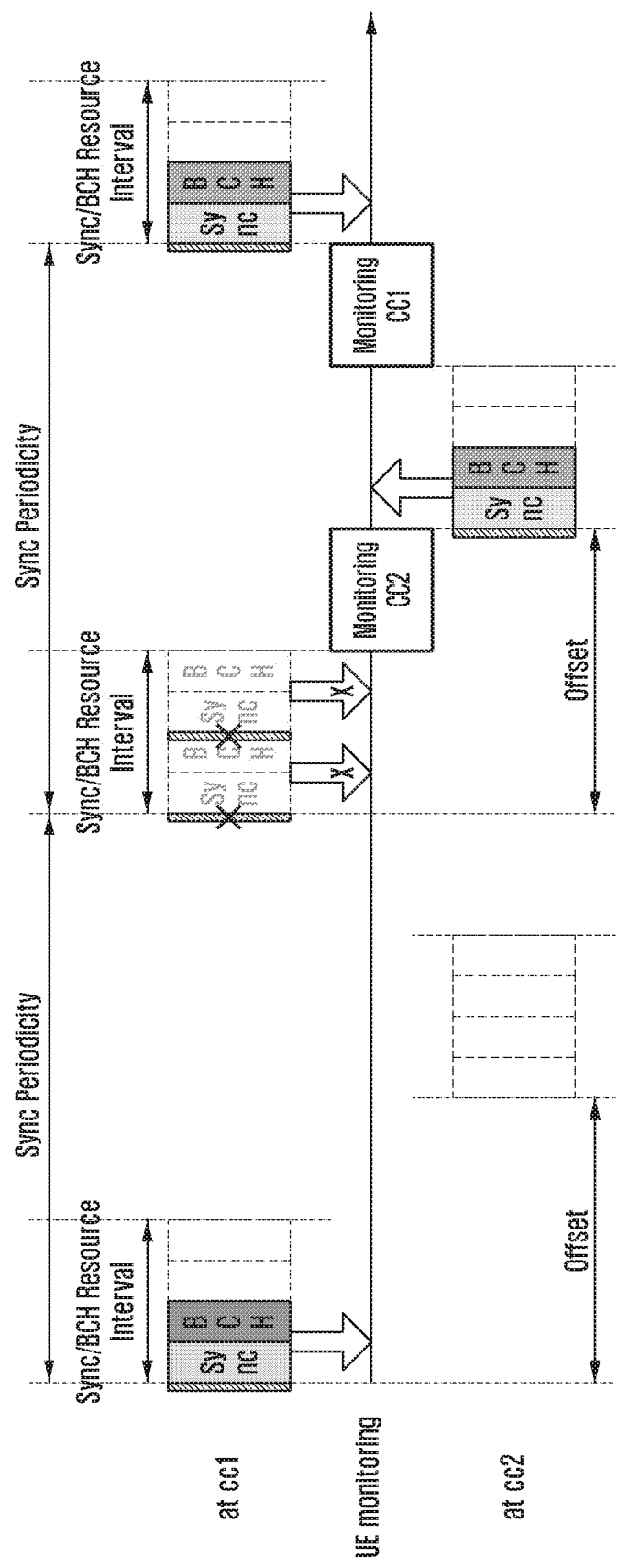
FIG. 14 is a diagram showing the configuration of a synchronization signal/BCH signal resource interval with respect to a plurality of CCs according to an embodiment of the disclosure.

FIG. 14 is a diagram showing the configuration of a synchronization signal/BCH signal resource interval with respect to a plurality of CCs according to an embodiment of the disclosure. When a synchronization signal/BCH signal resource interval operates with respect to a plurality of frequency bands, that is, a plurality of component carriers (CCs), a base station basically transmits a synchronization and BCH signal at a primary cc (cc1 of FIG. 14), and may transmit a synchronization and BCH signal at an extra secondary cc (cc2 of FIG. 14) when an LBT failure occurs. At the cc1, the base station provides notification of whether the cc2 is used as a synchronization assistance cc and of a reference time difference (offset) between the cc1 and the cc2 through a BCH. As shown in FIG. 14, if a UE does not detect a synchronization signal within a synchronization signal/BCH resource interval given within the cc1, the UE changes an RF to the auxiliary secondary cc and monitors a synchronization signal in a synchronization signal/BCH resource interval in which an associated offset has been taken into consideration.

According to an additional embodiment, a base station may manage a plurality of CCs as a group, and may configure group information in a UE or may configure the UE so that the UE understands that the plurality of CCs corresponds to one cc, but has a plurality of sub-channels. In either method, the base station needs to notify the UE of a primary synchronization transmission frequency and a secondary synchronization transmission frequency separately with respect to a plurality of frequency resources. To this end, the base station/network may configure a primary synchronization/BCH resource interval and a secondary synchronization/BCH resource interval separately with respect to the UE or may add them to one synchronization/BCH resource interval configuration and configure a secondary synchronization transmission frequency and corresponding offset information with respect to the UE.

Figure 15:
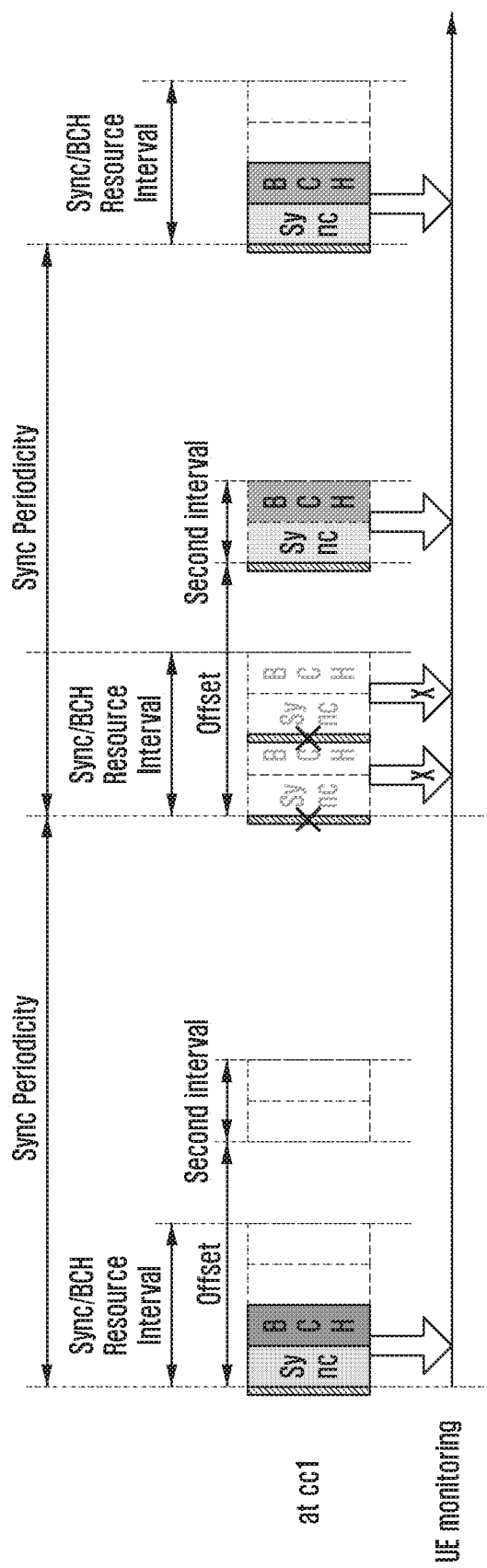
FIG. 15 is a diagram showing the configuration of a synchronization signal/BCH signal resource interval with respect to a plurality of CCs according to another embodiment of the disclosure.

FIG. 15 is a diagram showing the configuration of a synchronization signal/BCH signal resource interval with respect to a plurality of CCs according to another embodiment of the disclosure.

The configuration of a synchronization/BCH resource interval and a procedure for synchronization/BCH transmission and reception with respect to a plurality of CCs may be similarly applied to the same cc as in FIG. 15. To this end, a base station/network may separately configure a primary synchronization/BCH resource interval and a secondary synchronization/BCH resource interval with respect to a UE or may configure offset information by adding them to one synchronization/BCH resource interval configuration.

Figure 16:
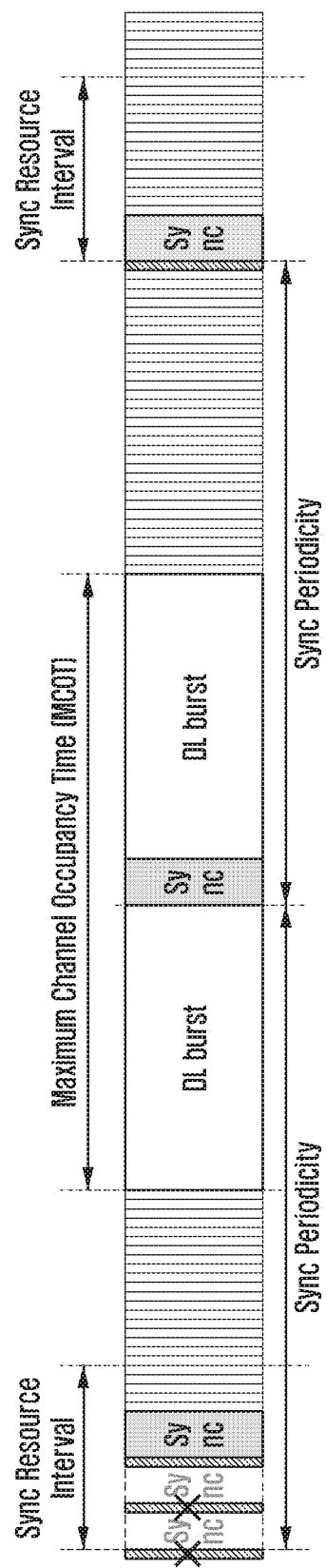
FIG. 16 is a diagram showing an example in which different LBTs are interchangeably used in one embodiment of the disclosure.

The transmission examples of a synchronization signal have illustrated operations of writing short LBT when a base station attempts to transmit only a synchronization signal in the state in which a channel has not yet been secured. However, in order to transmit a DL burst (contiguous DL subframe) for transmitting a known control/data channel, extended CCA or Long LBT is performed, and a channel is secured as a result of the execution. When a channel is secured, a base station may transmit a signal during a maximum channel occupancy time (MCOT) limited in regulations or standards. Accordingly, when synchronization signal transmission periodicity is reached within the MCOT, the base station may transmit the signal along with a DL burst without a separate LBT. FIG. 16 is a diagram showing an example in which different LBTs are interchangeably used in one embodiment of the disclosure. Referring to FIG. 16, a base station may transmit a synchronization signal without LBT when next synchronization signal transmission periodicity is reached within an MCOT interval because the base station can transmit the signal during the MCOT when it is successful in LBT.

Figure 17:
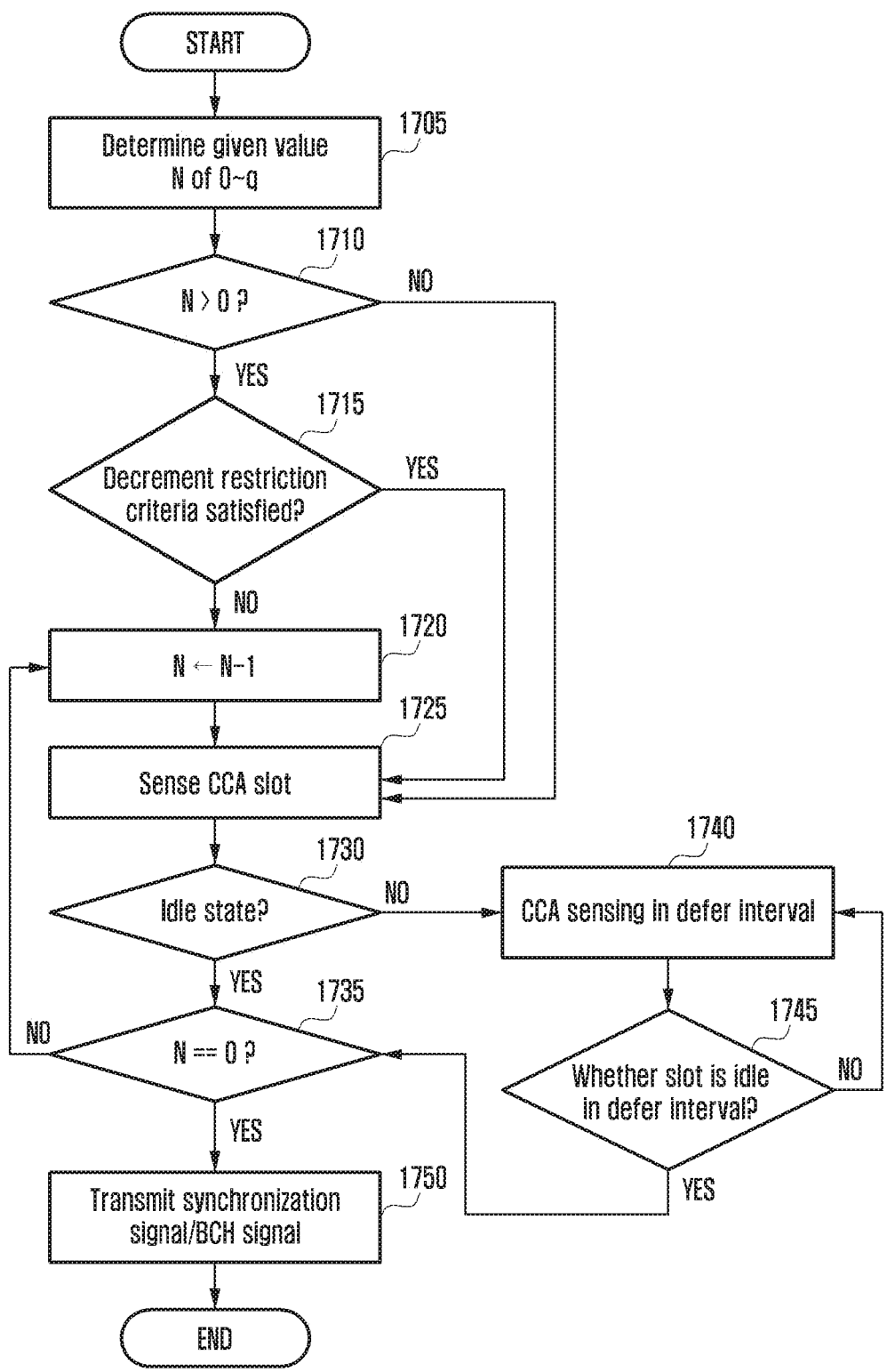
FIG. 17 is a diagram showing an operation for a base station to perform long LBT or ECCA in one embodiment of the disclosure.

FIG. 17 is a diagram showing an operation for a base station to perform long LBT or ECCA in one embodiment of the disclosure.

Referring to FIG. 17, at operation 1705, a base station determines a value, randomly selected from [0, q], to be N.

At operation 1710, a UE determines whether the determined N is greater than 0 The UE proceeds to operation 1715 when N is greater than 0, and proceeds to operation 1725 when N is not greater than 0.

At operation 1715, the UE identifies whether decrement restriction criteria are satisfied. The UE proceeds to operation 1725 when the decrement restriction criteria are satisfied, and proceeds to operation 1720 if not.

At operation 1720, the UE reduces the N value by 1.

At operation 1725, the base station senses one CCA slot. The base station proceeds to operation 1735 when a result of the sensing at operation 1730 is Idle and proceeds to operation 1740 when a result of the sensing at operation 1730 is not Idle.

When N is equal to 0 at operation 1735, the base station terminates an LBT operation, and may transmit a signal at operation 1750. When N is not equal to 0 at operation 1735, the base station proceeds to operation 1720.

At operation 1740, the base station senses each slot in order to identify whether there is a slot that is "busy" during Td in an additional defer interval from the last sensing slot.

The base station proceeds to operation 1735 if all slots are Idle during the Td, and returns to operation 1740 if all slots are not Idle during the Td.

When the signal is transmitted at operation 1750, the base station may transmit a DL burst including a control/data channel or may transmit a DL signal not including a control/data channel, for example, a synchronization signal or BCH. When the base station transmits the DL burst including a control/data channel within an MCOT, if sync periodicity is reached, the base station may transmit the synchronization signal at a location determined based on the system time of a frame/subframe/slot.

The base station does not sense a CCA slot, that is, a sensing target, or does not decrease N at timing satisfied based on one of a) the state in which the synchronization/BCH signal has been prepared to be transmitted, or b) the state in which the synchronization/BCH signal has been included in a synchronization/BCH resource interval, c) the state in which short LBT is performed in order to transmit the synchronization/BCH signal in a synchronization/BCH resource interval, or d) the state in which the synchronization/BCH signal is included in a synchronization/BCH resource interval and is not transmitted, when N is greater than 0 during the LBT procedure.

Figure 18:
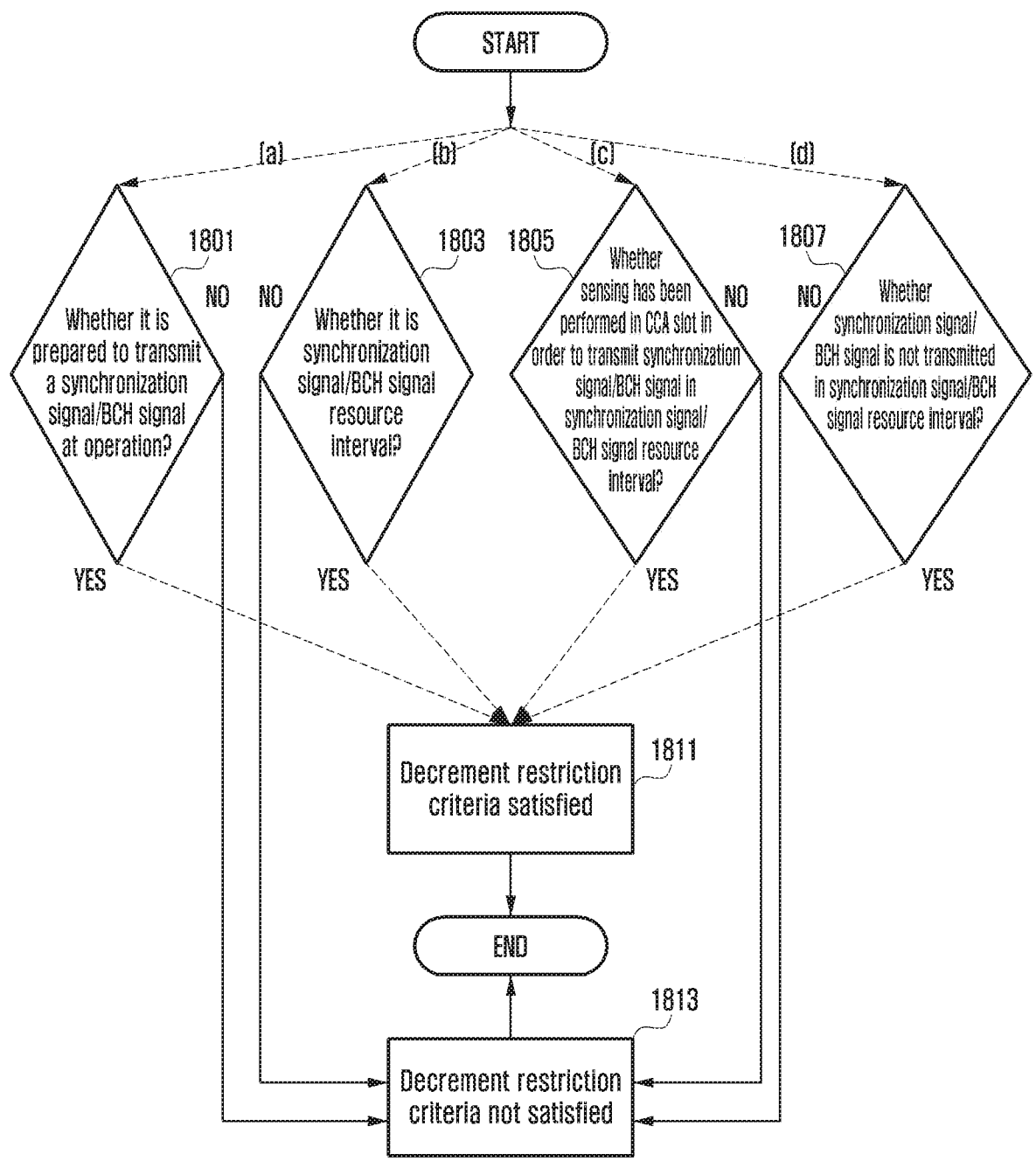
FIG. 18 is a diagram showing a procedure of determining operation 1715 in FIG. 17.

FIG. 18 is a diagram showing a procedure of determining operation 1715 in FIG. 17.

FIG. 18 shows an operation for a base station to determine criteria on which N is not decreased while the base station performs ECCA or Long LBT. When a determination is started, the base station identifies one of criteria (a), (b), (c), (d), and determines that the decrement restriction criteria are satisfied in the determination of 1715 when the corresponding criteria are satisfied. When the corresponding criteria are not satisfied, the base station determines that the decrement restriction criteria are not satisfied in the determination of 1715.

(a) The base station determines whether it is prepared to transmit a synchronization signal/BCH signal at operation 1801.

(b) The base station determines a synchronization signal/BCH resource interval at operation 1803.

(c) The base station determines whether sensing has been performed in a CCA slot in order to transmit the synchronization signal/BCH signal in the synchronization signal/BCH signal resource interval at operation 1805.

(d) The base station determines whether the synchronization signal/BCH signal is not transmitted in the synchronization signal/BCH signal resource interval.

The base station performs at least one of the operations (a), (b), (c), (d). The base station proceeds to operation 1811 if a result of the determination is yes, and proceeds to operation 1813 if a result of the determination is no. At operation 1811, the base station determines that the decrement restriction criteria for N at operation 1715 are satisfied. At operation 1813, the base station determines that the decrement restriction criteria for N at operation 1715 are not satisfied.

Figure 19:
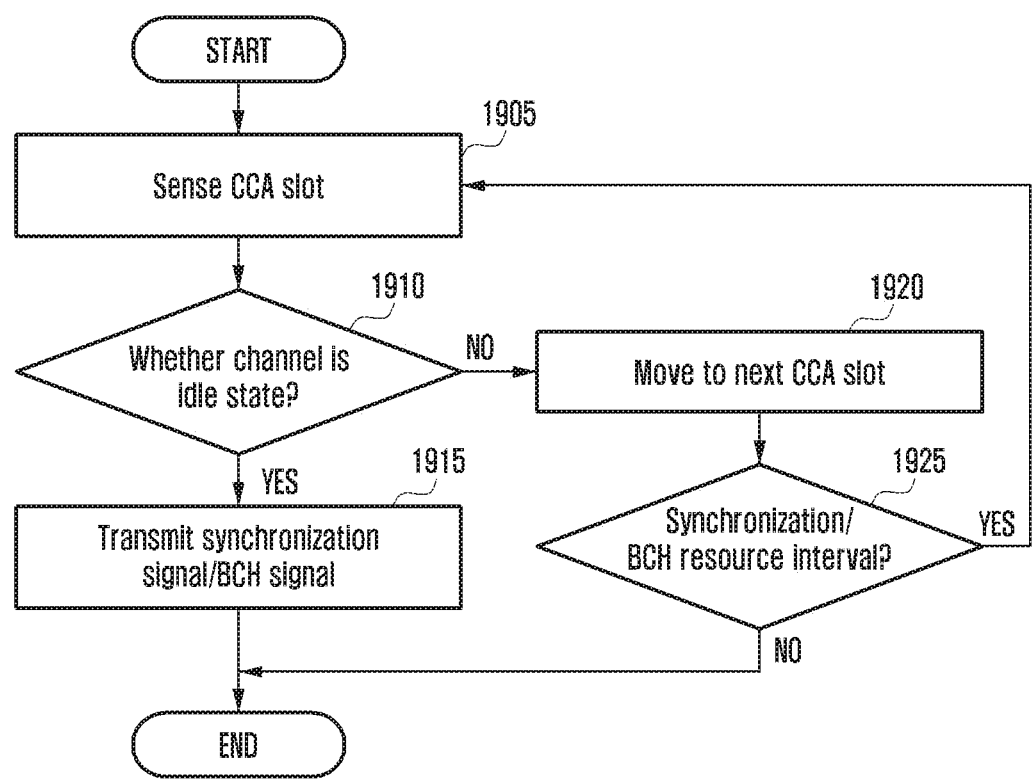
FIG. 19 is a diagram showing a short LBT procedure according to an embodiment of the disclosure.

FIG. 19 is a diagram showing a short LBT procedure according to an embodiment of the disclosure.

As in FIG. 19, a base station may perform a Short LBT procedure for Sync or BCH signal transmission separately from ECCA or Long LBT procedure.

At operation 1905, the base station performs short LBT for sensing only one CCA slot before it performs Sync/BCH.

At operation 1910, the base station identifies whether the CCA slot is idle. The base station proceeds to operation 1915 when the CCA slot is idle, and proceeds to operation 1920 when the CCA slot is not idle.

If a result of the sensing at operation 1910, the channel is idle, at operation 1915, the base station may immediately transmit a synchronization or BCH signal. If a result of the sensing at operation 1910, the channel is not idle (when the channel is busy), at operation 1920, the base station waits up to a next determined CCA slot location.

At operation 1925, the base station identifies whether the CCA slot is included in a Sync/BCH resource interval or whether the location of a Sync/BCH resource block subsequent to this CCA slot is included in a Sync/BCH resource interval. If the location of the Sync/BCH resource block is included in the Sync/BCH resource interval, the base station proceeds to operation 9101 of performing sensing on a CCA slot. If the location of the Sync/BCH resource block is not included in the Sync/BCH resource interval, the base station terminates the short LBT procedure for Sync/BCH signal transmission.

[Use Dynamic TTI]

A next unit is inevitably attempted when one transmit unit (TTI) is missed due to the uncertainty of a link occurring in an unlicensed band or an mmWave band. Accordingly, the probability that a TTI is reattempted to increase a success as the length of the TTI is reduced. A short TTI has been originally proposed by taking into consideration the use of the TTI in a licensed band for low latency communication, but may be changed and used for various purposes even in the mmWave or unlicensed band. Referring to LTE-U, licensed-assisted access (LLA) designed to use an unlicensed band based on previous mobile communication, that is, LTE, an SCell operating in an unlicensed band has been made to follow the same reference time and TTI boundary as a PCell in order to follow the reference time and TTI boundary of the PCell already obtained by a UE. For this reason, a base station is successful in LBT in an unlicensed band and attempts to directly use a resource, but cannot transmit and receive the existing designed signals until the TTI boundary is reached. In this case, if any signal is not transmitted, there is a good possibility that a different device may occupy a channel. Accordingly, in LAA, a base station has been permitted to transmit a reservation signal in the standard in terms of an implementation.

Figure 20:
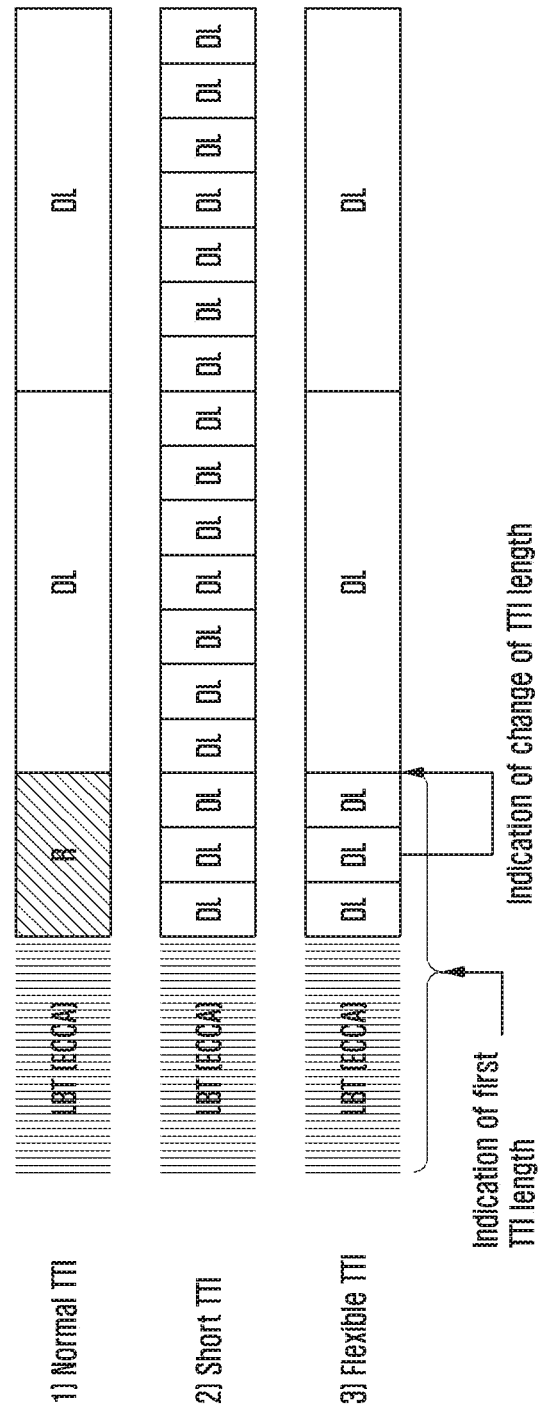
FIG. 20 is a diagram showing an operation of obtaining an unlicensed band resource according to an embodiment of the disclosure.

FIG. 20 is a diagram showing an operation of obtaining an unlicensed band resource according to an embodiment of the disclosure.

1) of FIG. 20 shows an operation of LAA in a normal TTI. After LBT/ECCA is performed, a base station transmits a reservation signal in an R period. While the reservation signal is transmitted, the base station may transmit a DL signal when a next TTI boundary is reached.

If a short TTI is introduced in NR, when a base station attempts to obtain a resource, it may use a short TTI as in 2) of FIG. 20 without transmitting a reservation signal, thereby being capable of improving efficiency. If a short TTI is used, downlink transmission efficiency can be improved because a DL signal can be transmitted even in the interval in which a reservation signal is transmitted in 1) of FIG. 20. The short TTI method is a method used to provide low latency performance despite control/reference signal overhead although control and reference signals are included in each TTI.

In an embodiment of the disclosure, as in 3) of FIG. 20, an operation of applying a flexible TTI method of operating a short TTI and a normal TTI together to an unlicensed band is taken into consideration. That is, a base station performs an LBT operation in the state in which it has not secured a channel, and transmits a subframe, configured as short TTI, when the LBT is successful (e.g., when a backoff counter becomes 0). The base station transmits a subframe that is pre-configured or configured as a normal TTI from desired timing. 3) of FIG. 20 shows such an operation and the type of indicator necessary for a UE. The UE needs to receive indication, regarding that the UE has to expect to receive a subframe, configured as a short TTI, in which criteria and when a subframe configured as a short TTI will be changed into a subframe configured as a normal TTI, from the base station.

The following procedure is necessary in order to support a flexible TTI operation in an unlicensed band as described above.

1) A procedure for a base station to notify a UE when the base station has secured a channel 2) A procedure for the base station to notify the UE of TTI or subframe configuration information to be first used in the state in which the base station has not secured a channel 3) A procedure for the base station to notify the UE of TTI or subframe configuration information to be changed in the state in which the base station has secured a channel The UE is aware that when the base station has returned and secured a channel resource from which timing based on 1), performs a reception operation according to the TTI/subframe configuration information obtained based on 2) in the state in which the channel resource has been returned, and performs a reception method change operation according to the TTI/subframe configuration information obtained based on 3) in the state in which the channel resource has been secured.

The followings illustrate a detailed operation for supporting a flexible TTI according to two scenarios.

A. Scenario Capable of Control Through a Licensed Band

A-1) A base station may provide notification of 1 bit information, indicating whether a channel has been secured or not through the PCell of a licensed band, for example, through a common DL control indicator (DCI). Alternatively, the base station may provide notification of information indicating that resource access will be attempted from a given TTI/subframe in the future in the state in which a channel has not been secured with respect to a given carrier. Alternatively, the base station may provide notification of information indicating that resource access will be maintained up to a given TTI/subframe in the future in the state in which a channel has been secured with respect to a given carrier. Information (carrier indicator field (CIF)) indicative of a given carrier and time information (start/end, periodicity, offset, etc.) may be indicated for each UE or by a common signal.

A-2) The base station may previously notify a UE of TTI/subframe configuration information to be used in the state in which a channel has not been secured in a given carrier through a radio resource control (RRC) message or layer1 (L1) signal. The TTI/subframe configuration information may be indicated along with valid time (start and end, periodicity, offset, etc.) information or may be indicated along with valid timer information based on timing when the UE receives the information. If a time area indicated by previous indication and a time area indicated by new indication overlap, the UE may follow at least one of a) the new indication; b) an L1 signal rather than an RRC message.

A-3) The base station notifies the UE when TTI/subframe configuration information is modified from given timing along with a carrier indicator (CIF), if necessary, using an L1 signal. If the UE is not prepared for a configuration information change timing, indicated by the base station, due to latency occurring in a process of preparing/processing a transmission and reception operation due to a change in the TTI/subframe configuration information, there is a method for the UE a) to disregard a TTI/subframe that is difficult to transmit and receive/process due to the latency, b) to report TTI/subframe timing capable of transmission and reception/processing to the base station, c) to report information on processing latency according to given TTI/subframe configuration information; the UE may perform at least one of the methods. The UE expects that the base station will operate based on RRC or changed configuration information from a boundary closest to indicated timing among preset TTI/subframe boundaries, and performs a transmission and reception operation.

Signals necessary for the A-1, 2, 3) may be separately transmitted or may be integrated into one signal and transmitted.

B. Scenario Operating Only in an Unlicensed Band

B-1) When a reference signal (RS) transmitted by a base station is received, a UE may identify that the base station performs transmission in a given unlicensed band carrier. However, in the flexible TTI environment, the UE cannot assure whether the base station performs transmission in a normal TTI, whether the base station performs transmission in a short TTI, or whether the base station has not secured a channel. Accordingly, the UE must have detected all the three possibilities, thereby increasing a reception burden of the UE. In order to reduce the reception burden of the UE, the base station may provide the UE with indication regarding at least one of a) that a channel resource will be occupied up to which timing, b) that the UE will operate according to TTI/subframe configuration information that is now used up to which timing. The timing indicated in the a), b) may be explicitly included in an indicator or may have been implicitly pre-configured. When the TTI/subframe configuration information obtained based on the most recently received information and a valid interval thereof elapse, the UE may have determination criteria indicating that a) the base station has failed in securing a channel, b) the channel has been returned or c) the TTI/subframe configuration information has been changed; the UE interprets the determination criteria as at least one of the determination criteria. For an accurate determination, the UE may additionally detect the reference signal of the base station according to previous TTI/subframe configuration information.

B-2) After the channel is returned, the base station a) may pre-configure, b) may configure, through an RRC message or c) may configure, through an L1 signal, TTI/subframe configuration information necessary for the UE to receive a TTI/subframe to be used after the UE secures the channel of the base station again. Specifically, the base station may previously notify the UE of TTI/subframe configuration information to be used in the state in which a channel has not been secured in a carrier on which transmission and reception are performed through a radio resource control (RRC) message or a layer1 (L1) signal. The TTI/subframe configuration information may be indicated along with valid time (start and the end, periodicity, offset, etc.) information or may be indicated along with valid timer information based on timing when the UE receives the information. If a time area indicated by previous indication and a time area indicated by new indication overlap, the UE may follow at least one of a) the new indication; b) an L1 signal rather than an RRC message.

B-3) The base station notifies the UE when TTI/subframe configuration information is changed from which timing through an L1 signal with respect to a carrier on which transmission and reception are performed. If the UE is not prepared for configuration information change timing, indicated by the base station, due to latency occurring in a process of preparing/processing a transmission and reception operation due to a change in the TTI/subframe configuration information, there may be an operation for the UE a) to disregard a TTI/subframe that is difficult to transmit and receive/process due to the latency, b) to report TTI/subframe timing capable of transmission and reception/processing to the base station through a control channel of another carrier, c) to report information on processing latency according to given TTI/subframe configuration information after access success; the UE may perform at least one of the operations. The UE expects that the base station will operate based on RRC or changed configuration information from a boundary closest to indicated timing among preset TTI/subframe boundaries, and performs a transmission and reception operation.

Figure 21:
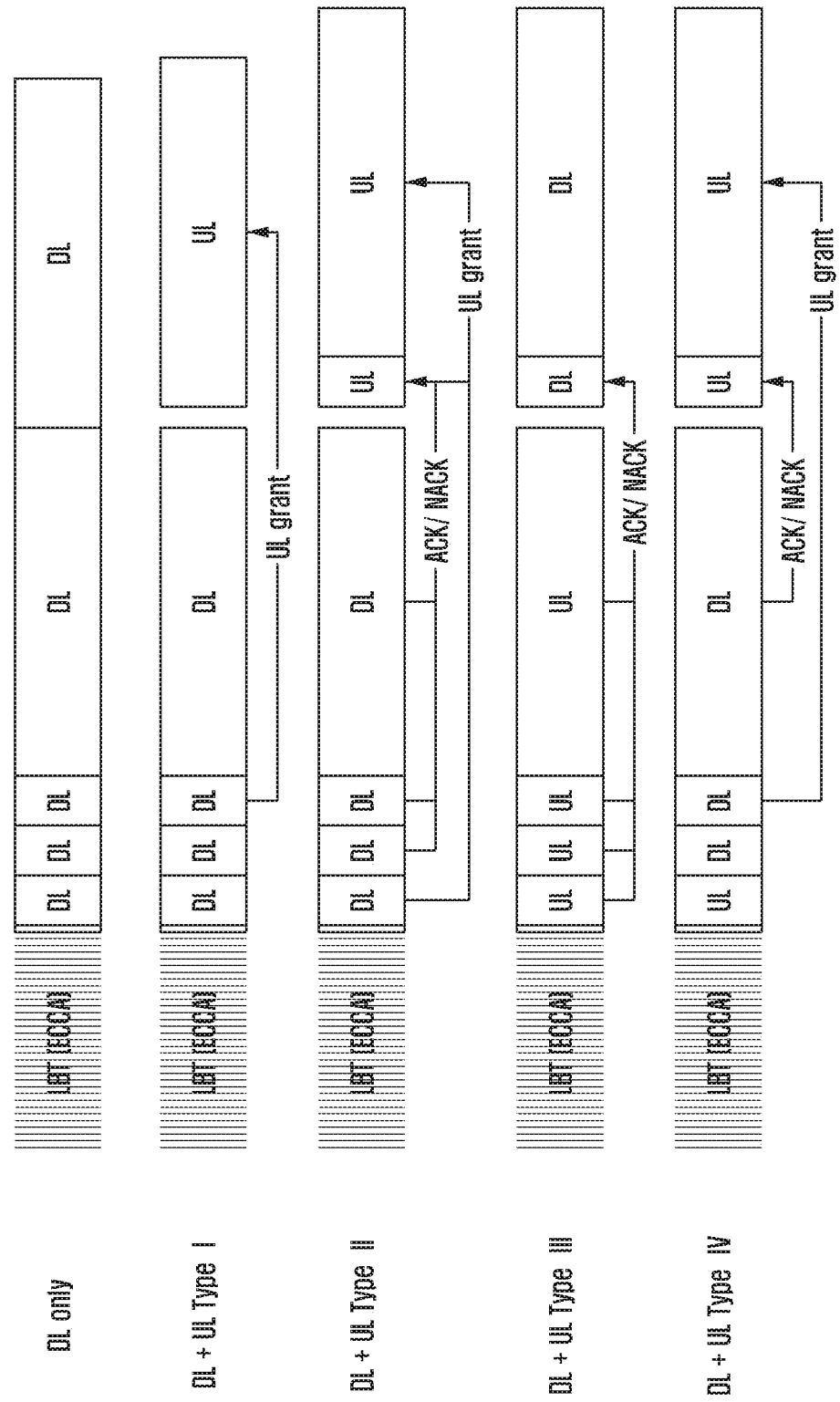
FIG. 21 is a diagram showing various combinations of TTI/subframes and duplex methods in one embodiment of the disclosure.

FIG. 21 is a diagram showing various combinations of TTI/subframes and duplex methods in one embodiment of the disclosure.

In addition to the TTI/subframe configuration information, a base station may transmit duplex information (uplink/downlink/uplink-downlink). A UE performs a base station signal reception operation according to the TTI/subframe configuration information only when it is configured downward in a given time interval. If the UE is configured uplink-downlink in a given time interval (D2D, sidelink), the UE determines whether to operate autonomously or under the control of a base station, and operates a corresponding uplink-downlink transmission and reception procedure. If the UE is configured upward in a given time interval, in general, the UE does not perform a separate transmission operation when a grant or pool allocation from the base station is not present. However, in an embodiment of the disclosure, an example in which a UE secures a channel by first transmitting a signal in the state in which a base station has not secured the channel is taken into consideration.

In FIG. 21, DL_UL Type III and the Type IV show examples in which a UE secures a channel by first transmitting a signal. For such an operation, TTI/subframe configuration information in the state in which a channel configured by a base station has not been secured is identically applied to the transmission and reception of a UE. A UE may contend to secure a channel through an LBT operation with a base station. A UE that has first succeeded in LBT earlier than a base station transmits an UL signal based on configured TTI/subframe configuration information. The base station may pre-configure a resource allocation/format and transmitted contents for a signal first transmitted by the UE after the channel is secured through an RRC message or L1 signal. The UE may perform uplink transmission in contiguous subframes within a maximum channel occupancy time performed for a channel that has been secured once and within a limit time/number configured by the base station. According to the DL+UL Type III, a UE initially operates a TTI/subframe configuration for uplink transmission according to a short TTI and changes to a normal TTI after a third short TTI. In this case, it is assumed that the UE receives an indicator, indicating that a base station changes TTI/subframe configuration information from corresponding timing through a PCell (or a licensed band cell). In contrasts, according to the DL+UL Type IV, only one uplink transmission is permitted for a UE, and a base station may transmit a corresponding DL control signal in a next subframe. The base station configures configuration information of a subsequent subframe in the UE through a DL control signal. In accordance with an embodiment, a UE that has succeeded in LBT transmits a channel-securing signal right before an uplink subframe. Another adjacent UE that has received the channel-securing signal can be aware that a subsequent uplink subframe has been secured. A physical layer technology in which a base station receives signals from a plurality of UEs by spreading interference into a frequency, code, etc. although a collision probability is present may be used. A base station may control UEs that have succeeded in reception in a subsequent downlink subframe.

[Strong Data Transmission Method]

In order to overcome the uncertainty of transmission in an unlicensed band or mmWave band, an operation of transmitting and receiving a plurality of signals from base stations, disposed at a plurality of different locations, to one UE at the same time through a plurality of links is taken into consideration.

Figure 22:
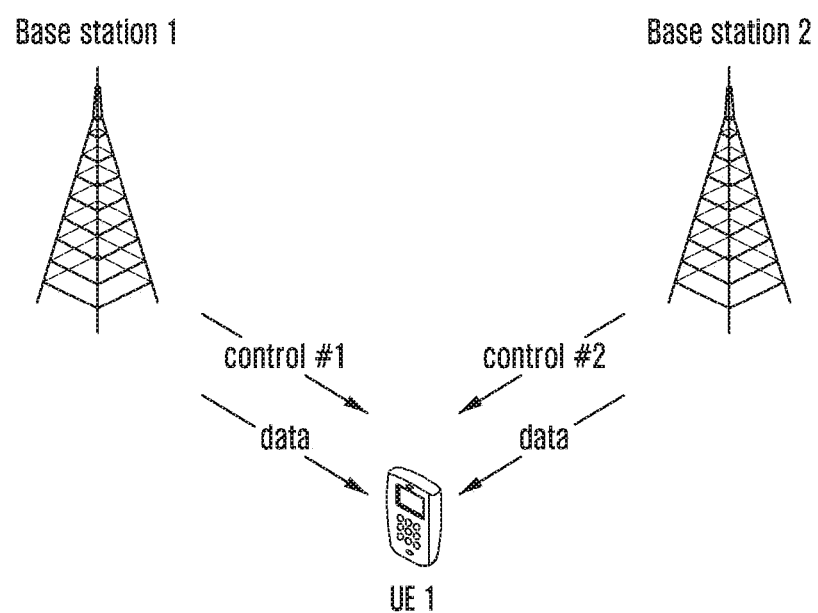
FIG. 22 is a diagram showing scenarios in which a plurality of control/data signals is transmitted and received through a plurality of links in one embodiment of the disclosure.

FIG. 22 is a diagram showing scenarios in which a plurality of control/data signals is transmitted and received through a plurality of links in one embodiment of the disclosure.

Referring to FIG. 22, the control signal #1 of a base station 1 and the control signal #2 of a base station 2 are transmitted to a UE, and the same data is transmitted in resources indicated in the respective control signals #1 and #2. For efficiency of resources, 1) each control signal and data may be transmitted at the same timing, 2) the control signals may be transmitted at different timings and the data may be transmitted at the same timing, or 3) the control signals may be transmitted at the same timing and the data may be transmitted at different timings. In the 1), 2), and 3), the same timing is one of a) transmission in the same subframe, b) transmission within one burst configured a single contiguous downlink subframe, c) transmission a maximum channel occupancy time (MCOT) secured by a base station.

Figure 23:
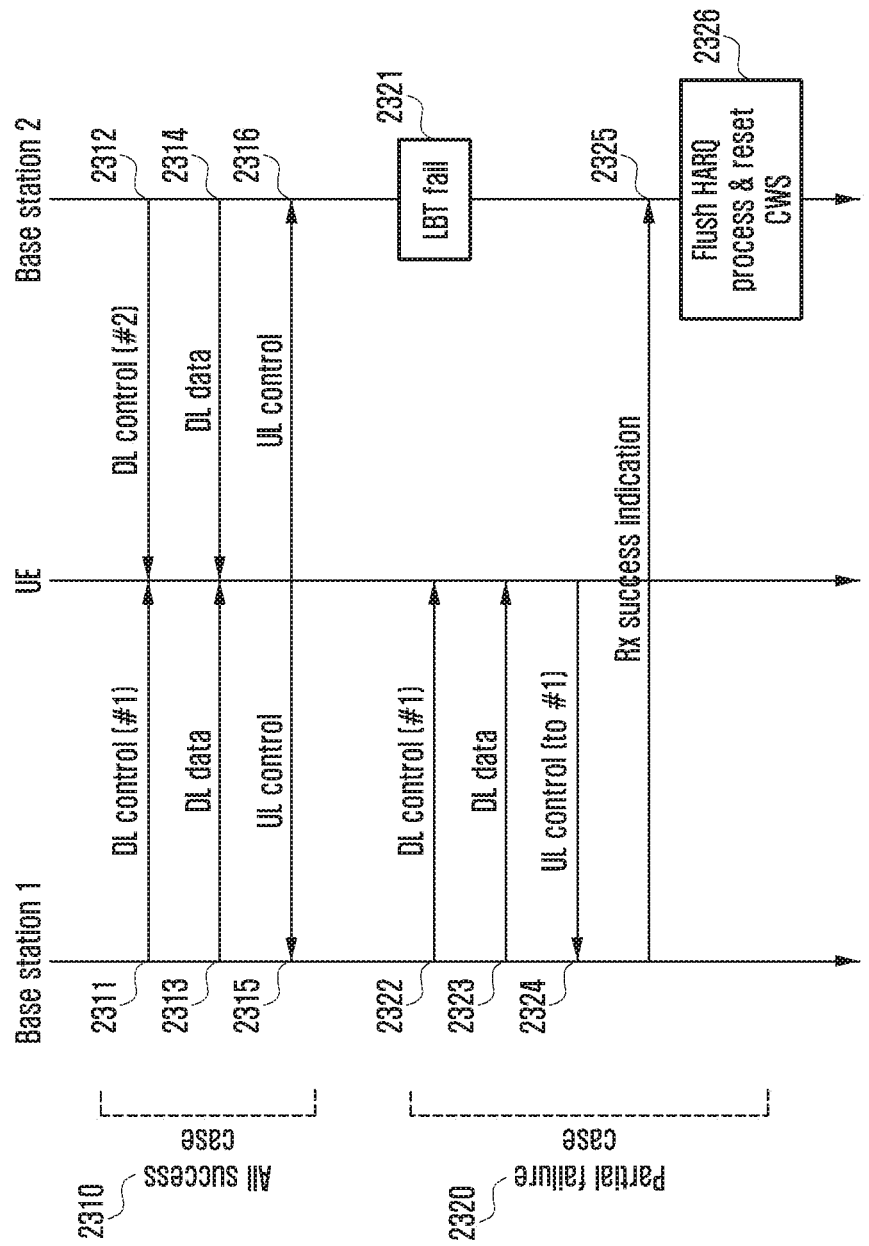
FIG. 23 is a diagram showing a signal reception failure scenario when a plurality of control/data signals is transmitted and received through a plurality of links in one embodiment of the disclosure.

FIG. 23 is a diagram showing a signal reception failure scenario when a plurality of control/data signals is transmitted and received through a plurality of links in one embodiment of the disclosure.

In such a system, some of the transmission and reception of a plurality of links may fail as in FIG. 23 due to the LBT of an unlicensed band or the beam mismatch/misalignment of a mmWave band. However, data reception for a corresponding packet or resource block has been completed because there is a link whose transmission and reception has been successful.

However, in a failed link (link between a base station 2 and a UE in FIG. 23), the base station 2 is unaware of the transmission and reception results of a successful link (link between a base station 1 and the UE in FIG. 23). Accordingly, it is not easy for the base station 2 to reattempt a next operation, that is, failed packet transmission, or to give up the next operation.

An embodiment of the disclosure proposes a method of controlling scheduling and HARQ transmission for transmission and reception by sharing the results of any one successful link of a plurality of links with a failed base station. A plurality of the base stations needs to be preconfigured as a coordinated set in an RRC connection (re)establishment procedure as in CoMP. This may be different from a configuration for the existing CoMP in a detailed procedure.

A. Operation Scenario in an Unlicensed Band

FIG. 23 is a diagram showing a procedure of operating a plurality of links in an unlicensed band according to an embodiment of the disclosure.

In particular, in a known unlicensed band less than 6 GHz, an operation may be performed according to a procedure, such as FIG. 23. A procedure 2310 corresponds to a case where the UE has succeeded in the reception of all downlink signals. At operation 2311, the UE receives downlink (DL) control information from the base station 1. At operation 2312, the UE receives a control signal from the base station 2. At operation 2313, the UE receives downlink (DL) data from the base station 1. At operation 2314, the UE receives DL data from the base station 2. If all links have succeeded (all success case), a UE that has received DL control/data signals transmits HARQ ACK/NACK results for the received packets. At operation 2315, the UE transmits UL control information, including HARQ ACK/NACK results for the DL data, to the base station (node 1). At operation 2316, the UE transmits UL control information, including HARQ ACK/NACK results for the DL data, to the base station (node 2).

A procedure 2320 corresponds to a case where the UE has failed in the reception of some downlink signal. At operation 2321, the base station 2 fails in LBT and may not transmit DL control information and DL data information. At operation 2322, the UE receives a DL control signal from the base station 1. At operation 2323, the UE receives DL data from the base station 1.

The UE has received the DL data transmitted by the base station 1, but has not received a DL control signal and data from the base station 2 because the base station 2 has failed in LBT and has not transmitted the downlink signal. As described above, when some link fails (partial failure case), a UE reports a reception success through a control channel allocated by a transmitter 1 (base station 1) identified by an identifier (node ID, C-RNTI, M-RNTI, group-RNTI, etc.) included in a control channel. At operation 2324, the UE transmits UL control information, including ACK/NACK results for the DL data reception, to the base station 1.

At operation 2325, the base station 1 transmits information (e.g., Rx success indication), providing notification of a transmission success for a given packet (or a given HARQ process ID or a given subframe), to the base station 2. Accordingly, at operation 2326, the base station 2 discards information within a buffer without retransmitting the corresponding packet. Furthermore, the base station 2 performs an operation of resetting a contention window size (CWS) because the transmission of the base station 1 has been successful although the transmission of the base station 2 has failed without performing an operation of doubling the CWS based on HARQ-NACK reception results for a packet transmission failure according to an LBT operation in an unlicensed band.

Figure 24:
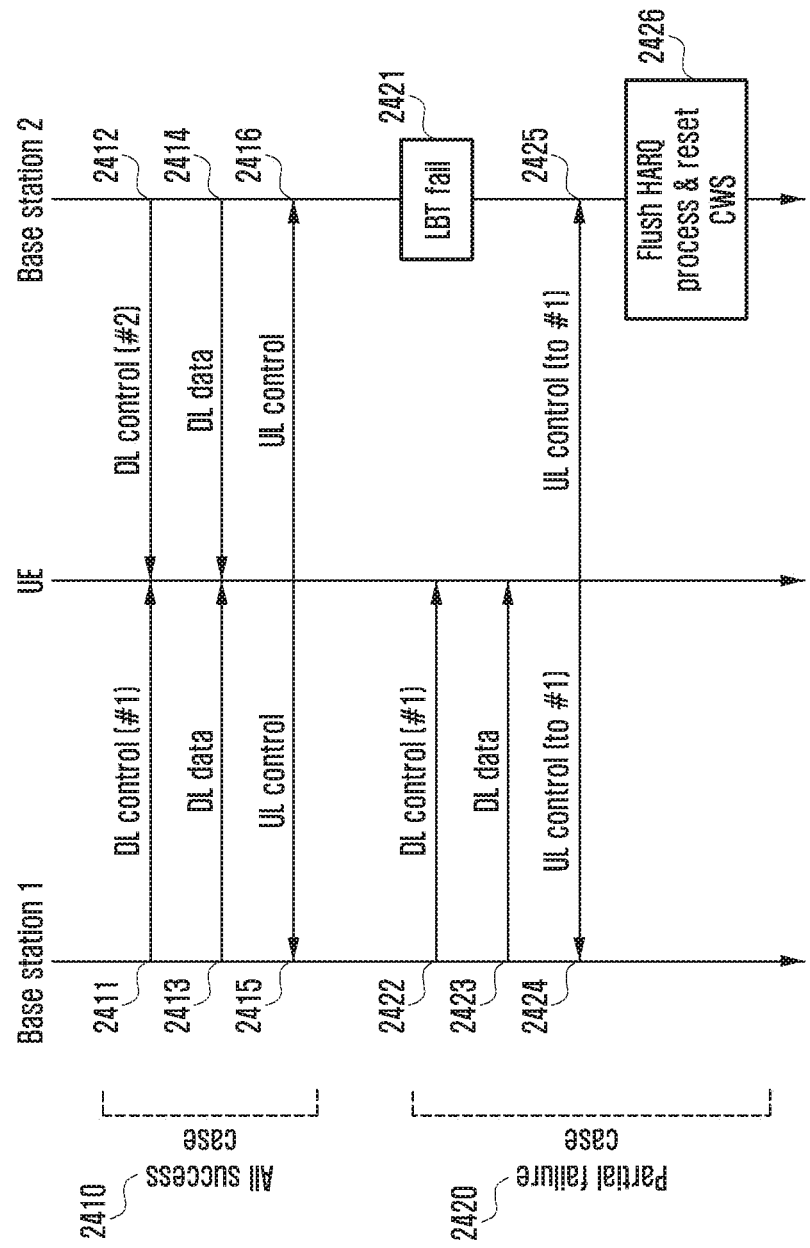
FIG. 24 is a diagram showing a procedure of operating a plurality of links in an unlicensed band according to another embodiment of the disclosure.

FIG. 24 is a diagram showing a procedure of operating a plurality of links in an unlicensed band according to another embodiment of the disclosure. In FIG. 24, operations 2410 to 2423 correspond to operations 2310 to 2323 of FIG. 23.

As in the situation of FIG. 23, FIG. 24 corresponds to a case where a UE has received DL data from a base station 1, but has not received DL data from a base station 2. In the embodiment of FIG. 23, the base station 1 has notified the base station 2 of the reception of a given packet by the UE. In the embodiment of FIG. 24, the UE directly notifies the base station 2 of the transmission success or reception success of a packet received from the base station 1. At operation 2424, the UE may transmit UL control information, including ACK/NACK results for the DL data reception, to the base station 1. At operation 2425, the UE may transmit UL control information, including ACK/NACK results for the DL data reception, to the base station 2. In this case, the UE may include information indicating that the received data is data received from the base station 1. To this end, the same UL control channel needs to have been configured in the UE between the plurality of base stations. Operation 2426 corresponds to operation 2326 of FIG. 23.

B. Operation Scenario in an mmWave Band

Figure 25:
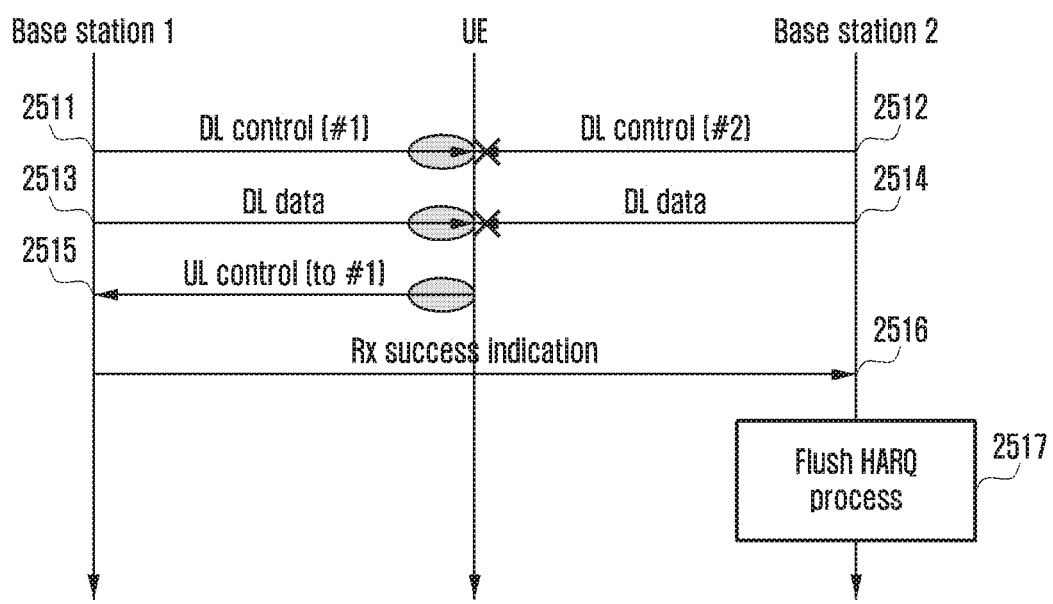
FIG. 25 is a diagram showing a procedure of operating a plurality of links in an mmWave band according to an embodiment of the disclosure.

FIG. 25 is a diagram showing a procedure of operating a plurality of links in an mmWave band according to an embodiment of the disclosure.

In an mmWave band, the beam of a UE has been directed toward a given base station. Accordingly, it is not easy for the UE to receive signals from a plurality of base stations at the same time. At operation 2511, a UE may receive DL control information from a base station 1. At operation 2513, the UE may receive DL data from the base station 1. At operation 2512, the UE fails in the reception of DL control information from a base station 2. At operation 2514, the UE may fail in DL data reception from the base station 2.

A signal from the base station 2 is not successful. The UE reports whether the reception is successful in an UL control channel through a transmission beam configured with respect to the base station 1 in response to the signal from the base station 1 at operation 2515.

At operation 2516, the base station 1 transmits information (e.g., Rx success indication), providing notification of a transmission success for a given packet (or a given HARQ process ID or a given subframe), to the base station 2 based on the information received from the UE.

Accordingly, at operation 2517, the base station 2 discards information within a buffer without retransmitting the corresponding packet. Operation 2517 may correspond to operation 2326 of FIG. 23.

Figure 26:
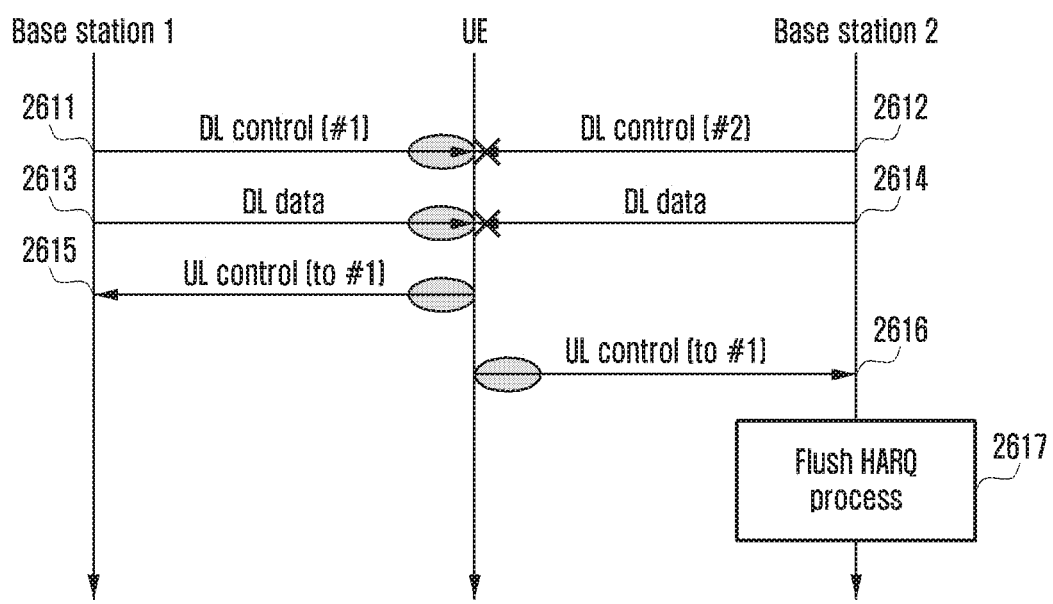
FIG. 26 is a diagram showing a procedure of operating a plurality of links in an mmWave band according to another embodiment of the disclosure.

FIG. 26 is a diagram showing a procedure of operating a plurality of links in an mmWave band according to another embodiment of the disclosure.

Operations 2411 to 2415 of FIG. 26 correspond to operations 2511 to 2515 of FIG. 25. FIG. 26 is a case where a UE has received DL data from a base station 1, but has not received DL data from a base station 2 as in the case of FIG. 25. In the embodiment of FIG. 25, the base station 1 has notified the base station 2 of the reception of a given packet by the UE. In contrast, in the embodiment of FIG. 26, the UE directly notifies the base station 2 of the transmission success or reception success of a packet received from the base station 1. The UE may adjust a beam and report DL data reception results to both the base station 1 and the base station 2. At operation 2616, the UE may transmit UL control information, including ACK/NACK results for the DL data reception, to the base station 2. In this case, the UE may include information indicating that the received data is data received from the base station 1. To this end, UL control channels for the base station 1 and the base station 2 need to have been pre-configured at different timings. Operation 2617 corresponds to operation 2517 of FIG. 25.

The examples have been described by taking into consideration an HARQ transmission and reception and memory management operation. The same operation may be identically applied to the ARQ of the RLC layer or the PDCP packet transmission and reception of the PDCP layer. For example, in the ARQ of the RLC layer, each RLC packet is assigned a sequence number (SN), and a transmission unit updates the transmission window of a successful packet when feedback for a successfully transmitted packet is received from a reception unit. The reception unit also has a window of the same length, and thus the feedback transmitted from the reception unit to the transmission unit may be information on one or more packets. The transmission unit removes a packet that belongs to packets whose transmission has failed and that is positioned ahead of a packet having the smallest SN value from the transmission window based on the feedback, and reattempts the transmission of packets within the transmission window. If the procedure of receiving feedback for transmission results in a plurality of links proposed in the disclosure is applied, a base station receives RLC layer feedback for another successful link from another base station or UE. The base station updates the transmission window of a link whose transmission has failed based on the feedback for another successful link, and reattempts the transmission of next ARQ packets. Additionally, the base station may adjust L1/2 variables, related to transmission adjusted in the RLC layer as transmission performance becomes poor, to its original state or assuming that transmission performance becomes better. A similar operation may be applied to the PDCP layer because a transmission window, reception window and SN-based feedback for a partial packet loss are similar to those of the RLC layer.

Figure 27:
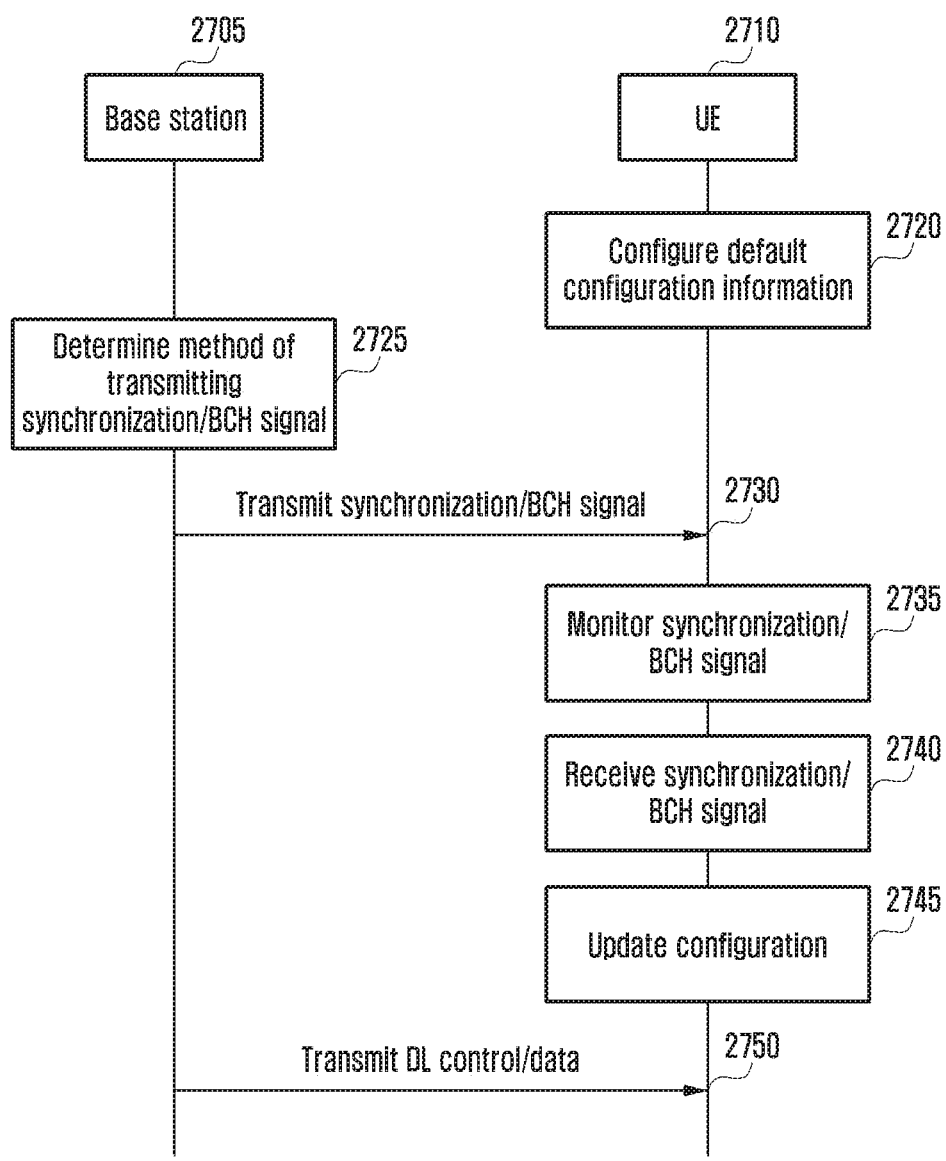
FIG. 27 is a diagram showing operations of a terminal and a base station according to an embodiment of the disclosure.

FIG. 27 is a diagram showing operations of a terminal and a base station according to an embodiment of the disclosure.

Figure 28:
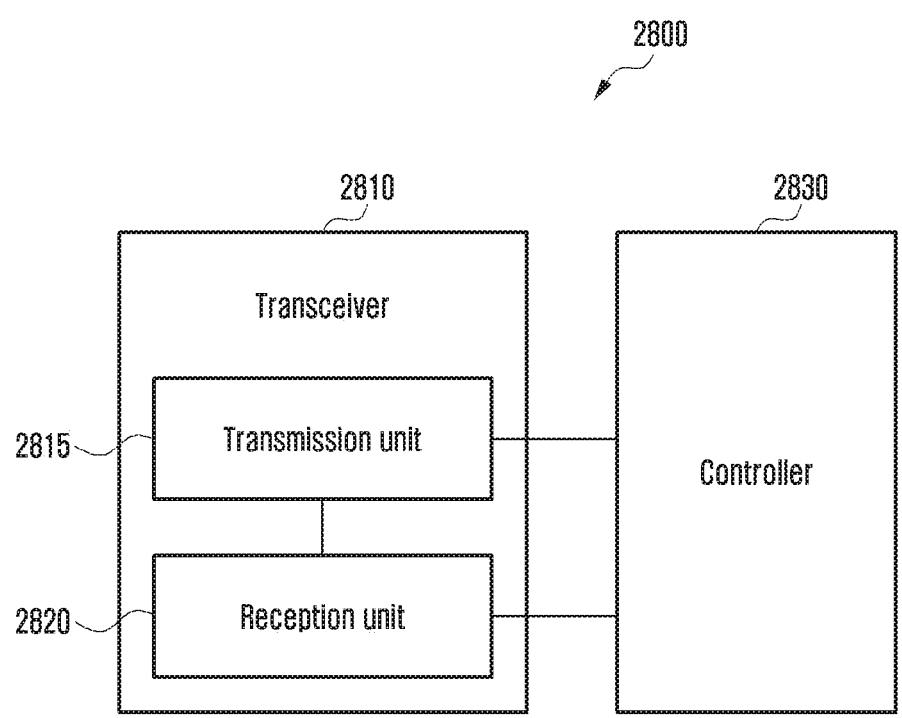
FIG. 28 is a diagram illustrating the device configuration of a terminal according to an embodiment of the disclosure.

Referring to FIG. 28, a communication system may include a base station 2705 and a UE 2710. Although not shown, in the communication system, the base station 2705 may serve a plurality of UEs. The UE 2710 may obtain synchronization from a plurality of base stations and perform cell selection and a procedure for attaching to a cell. In FIG. 27, the operation of each entity is described in brief, but a corresponding operation of the UE and the base station described with reference to FIGS. 1 to 21 may be applied to FIG. 27.

At operation 2720, the UE 2710 may configure basic configuration information. The basic configuration information may be named a default value. That is, when the UE 2710 does not obtain system information, etc. for a synchronization signal, the UE may apply preset values, may apply values configured through another radio access technology (RAT) (e.g., LTE), or may apply values configured through a macro cell group (MCG) of a dual connectivity (DC) structure as the values of synchronization signal periodicity and synchronization resource interval information. The UE 2710 obtains system information for a synchronization signal from a camping cell, and updates the existing configured values with the proposed information (synchronization signal periodicity, synchronization resource interval) related to synchronization transmission included in the system information. The UE 2710 may use the default information value until it receives information on a synchronization resource interval from the base station 2705 that has subsequently obtained synchronization.

At operation 2725, the base station 2705 may determine a transmission method for transmitting a synchronization signal. At operation 2725, the base station 2705 may determine a method for transmitting a synchronization signal and a BCH signal together. The base station 2705 may determine one of the various transmission methods, described with reference to FIGS. 7 to 16, as a method for transmitting the synchronization signal/BCH signal. For the detailed methods described in FIGS. 7 to 16, reference is made to the contents of each embodiment. According to the embodiments of the disclosure, a method of transmitting a plurality of synchronization signals may be provided and a method of transmitting a synchronization signal and a BCH signal together may be provided in a synchronization interval. An explicit selection method according to operation 2725 may be omitted. The base station 2725 may implicitly apply the methods of FIGS. 7 to 16 according to a pre-configured method.

At operation 2730, the base station 2705 may transmit a synchronization signal. The base station 2705 may transmit a BCH signal along with the synchronization signal. The base station 2705 may transmit the synchronization signal/BCH signal based on one of the methods described in FIGS. 7 to 16. The synchronization signal and the BCH signal may be transmitted together depending on which method is used, the BCH signal may be transmitted on the premise that the synchronization signal is transmitted, the synchronization signal and the BCH signal may be multiplexed and transmitted in a time domain, or the synchronization signal and the BCH signal may be multiplexed and transmitted in a frequency domain.

Meanwhile, the base station 2705 needs to perform LBT in order to transmit the synchronization signal. The base station 2705 performs LBT, and may transmit the synchronization signal/BCH signal based on a result of the execution of the LBT. For a method of performing LBT and a detailed example in which a synchronization signal/BCH signal is transmitted as a result of the execution of LBT, reference is made to the contents of FIGS. 7 to 18.

At operation 2735, the UE 2710 monitors a synchronization signal. The UE 2710 may monitor a synchronization signal and a BCH signal. Operation 2735 may correspond to at least one of operations 521, 523, 527, 529, 531 of FIG. 5, and may correspond to at least one of operations 615, 616, 618, 619, 620 of FIG. 6. Furthermore, the UE 2710 may monitor a synchronization signal and/or BCH signal by applying the concepts of the synchronization resource interval, synchronization/BCH resource interval, sub-interval, multiplexing, etc. according to the various examples of FIGS. 7 to 16.

At operation 2740, the UE 2710 may receive the synchronization/BCH signal. Operation 2740 may correspond to operation 525 of FIG. 5 or operation 617 and operation 625 of FIG. 6. The UE may receive the synchronization signal and the BCH signal together, and may receive the BCH signal after the reception of the synchronization signal. A method of receiving the synchronization signal and the BCH may be determined depending on that the base station 2705 has transmitted the synchronization signal/BCH signal using which method. Accordingly, the UE 2710 may receive the synchronization signal and the BCH signal using the methods corresponding to the methods of FIGS. 5 to 18. When the synchronization signal is received, the UE 2710 may identify sync reference timing. In an embodiment of the disclosure, a synchronization resource interval includes a plurality of synchronization signal transmission timings. When the UE 2710 receives a synchronization signal at given synchronization signal transmission timing, it may require information for identifying synchronization reference timing. In an embodiment of the disclosure, the UE 2710 may identify synchronization reference timing based on the ID of a synchronization signal included in the synchronization signal or time information within a BCH.

At operation 2745, the UE 2710 may update configuration information. If a default value has been used, the UE may update synchronization/BCH resource configuration information with a value received through a BCH signal. For example, the UE may change a synchronization/BCH resource interval using a method, such as that described in FIG. 7. The UE may start a timer from the update timing of the synchronization/BCH resource configuration information or may start the timer from timing when a base station that has obtained SI no longer satisfies cell selection criteria. The UE maintains the updated synchronization/BCH resource configuration information until the started timer expires according to one of the timer start methods. When the timer expires, the UE returns the synchronization/BCH resource configuration information of the base station to a default value. The timer value may be configured by a network/base station through SI or an RRC message. In a system using default configuration information, the update operation may be omitted.

Thereafter, as described in FIGS. 5 and 6, the UE 2710 may perform a procedure, such as random access, and may perform a procedure of additionally receiving system information, etc. in order to attach to a cell and identifying a parameter for cell access. Through such processes, the UE 2710 may attach to a cell of the base station 2705.

At operation 2750, the UE 2710 may receive DL control/data from the base station 2705. The UE 2710 may also transmit UL data to the base station 2705.

Although an embodiment of the disclosure has been described in brief through FIG. 27, it is to be noted that an embodiment of the disclosure that may be extended from FIG. 27 is not limited to the contents described in FIG. 27, but may be implemented as a combination of the configuration of FIG. 27 and a configuration that belongs to the contents of FIG. 27 and that corresponds to the contents of FIGS. 5 to 21.

FIG. 28 is a diagram illustrating the device configuration of a terminal according to an embodiment of the disclosure.

Referring to FIG. 28, a UE 2800 may include other devices, for example, a transceiver 2810, including a transmission unit 2815 and reception unit 2820 for performing signal transmission and reception to and from a base station, and a controller 2830 controlling all the operations of the UE 2800. The controller 2830 may include at least one processor. The embodiments of the disclosure for the resource allocation of an unlicensed band may be understood as being performed by the controller 2830. However, the controller 2830 and the transceiver 2810 do not need to be necessarily implemented as separate modules, but may be implemented as a single configuration unit in a form, such as a single chip.

The controller 2830 may control to monitor a synchronization signal transmitted by a base station based on a synchronization resource interval, to receive the synchronization signal based on the monitoring of the synchronization signal, and to access the base station based on synchronization obtained from the synchronization signal. The synchronization resource interval may include at least two non-contiguous sub-intervals.

Furthermore, the controller 2830 may control to identify reference synchronization timing of a plurality of synchronization signal transmission timings based on synchronization signal ID information included in a received synchronization signal.

Furthermore, the controller 2830 may control to receive a broadcast channel (BCH) signal, including system information, from a base station. The BCH signal may be transmitted by the base station only when the base station is successful in the transmission of the synchronization signal.

If the synchronization resource interval and a BCH resource interval have been configured together, BCH resource transmission timing may be determined based on the success timing of synchronization signal transmission by the base station. If the synchronization resource interval and the BCH resource interval have not been configured together, BCH resource transmission timing may be determined based on the listen before talk (LBT) success timing of the base station in the BCH resource interval after the synchronization signal transmission success of the base station. The UE attempts the reception of a synchronization signal or BCH signal until the reception is successful with respect to each transmission timing in the synchronization resource interval or BCH resource interval. If a synchronization signal or BCH signal reception fails with respect to all transmission timings within the synchronization resource interval or BCH resource interval, the UE determines that synchronization reception for the synchronization resource interval or BCH resource interval of corresponding periodicity has failed. A result of the determination may be used for another operation assigned to the UE by the base station, for example, cell reselection.

Furthermore, the controller 2830 may control the operations of the UE according to the embodiments of the disclosure described through FIGS. 1 to 27.

Figure 29:
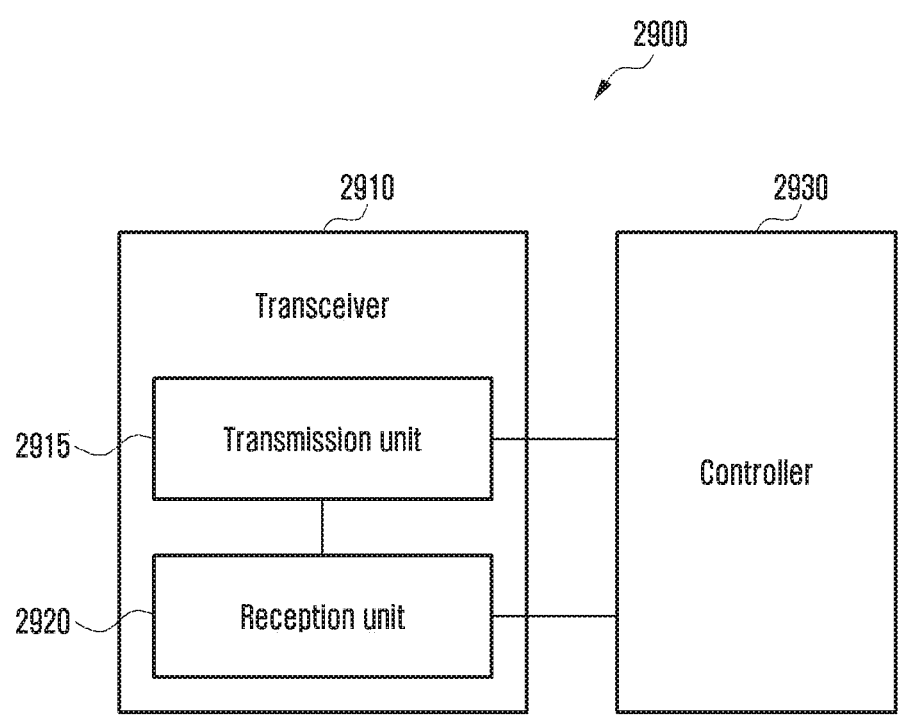
FIG. 29 is a diagram illustrating the device configuration of a base station according to an embodiment of the disclosure.

FIG. 29 is a diagram illustrating the device configuration of a base station according to an embodiment of the disclosure.

Referring to FIG. 29, the base station 2900 may include other devices, for example, a transceiver 2910, including a transmission unit 2915 and reception unit 2920 for performing signal transmission and reception to and from a UE or another base station, and a controller 2930 controlling all the operations of the base station 2900. The controller 2930 may include at least one processor. The embodiments of the disclosure for the resource allocation of an unlicensed band may be understood as being performed by the controller 2930. However, the controller 2930 and the transceiver 2910 do not need to be necessarily implemented as separate module, but may be implemented as a single configuration unit in a form, such as a single chip.

The controller 2930 may control to configure information on a synchronization resource interval for transmitting a synchronization signal, to perform listen before talk (LBT) based on the synchronization resource interval, and to transmit the synchronization signal in the synchronization resource interval based on a result of the execution of the LBT. The synchronization resource interval of synchronization signal transmission periodicity may include a plurality of synchronization signal transmission timings. The synchronization signal includes synchronization signal ID information. The synchronization signal ID information may be used to identify reference synchronization timing of the plurality of synchronization signal transmission timings. Furthermore, the synchronization resource interval may include at least two non-contiguous sub-intervals.

The controller 2930 may control to transmit a broadcast channel (BCH) signal including system information. The BCH signal may be transmitted when a base station is successful in synchronization signal transmission. If the synchronization resource interval and a BCH resource interval have been configured together, BCH resource transmission timing may be determined based on the success timing of the synchronization signal transmission. If the synchronization resource interval and the BCH resource interval have not been configured together, BCH resource transmission timing may be determined based on listen before talk (LBT) success timing in the BCH resource interval after a success of the synchronization signal transmission.

Furthermore, the controller 2930 may control the operations of the base station according to the embodiments of the disclosure described with reference to FIGS. 1 to 27.

It is to be noted that the LAA control/data signal transmission method, operation procedure of the LAA UE, resource frame configuration, and device configurations of the UE and the base station illustrated in FIGS. 1 to 29 have no intention to limit the scope of right of the disclosure. That is, all the configurations, entities or operations described in FIGS. 1 to 26 should not be essential elements for implementing the disclosure, and may be implemented without departing from the essence of the disclosure although some elements only are included.

The above-described operations of the base station or UE may be implemented by including a memory device in which corresponding program code has been stored in a given element within the base station or UE device. That is, the controller of the base station or UE device may execute the above-described operations by reading program code stored in the memory device by the processor or central processing unit (CPU) and executing the program code.

The various elements and modules of the entity, base station or UE device described in this specification may operate using a hardware circuit, for example, a complementary metal oxide semiconductor-based logic circuit, firmware, a hardware circuit, such as a combination of software and/or hardware and firmware and/or software inserted into a machine-readable medium. For example, the various electrical structures and methods may be implemented using electrical circuits, such as transistors, logic gates and application-specific integrated circuits.

Meanwhile, although the detailed embodiments have been described in the detailed description of the disclosure, the disclosure may be modified in various ways without departing from the scope of the disclosure. Accordingly, the scope of the disclosure should not be limited to the above-described embodiments, but should be defined by not only the claims, but equivalents thereof.

The invention claimed is:

1. A method performed by a user equipment in a wireless communication system, the method comprising:
   monitoring a synchronization signal transmitted by a base station based on a synchronization resource interval;
   receiving the synchronization signal based on the monitoring of the synchronization signal; and
   accessing the base station based on synchronization obtained from the synchronization signal,
   wherein the synchronization resource interval of synchronization signal transmission periodicity comprises a plurality of symbols for synchronization signal transmission,
   wherein, in case that, the synchronization resource interval and a BCH resource interval have been configured together, BCH resource transmission timing is determined based on success timing of the synchronization signal transmission, and
   wherein, in case that the synchronization resource interval and the BCH resource interval have not been configured together, the BCH resource transmission timing is determined based on listen before talk (LBT) success timing in the BCH resource interval after the success of the synchronization signal transmission.

2. The method of claim 1, wherein the user equipment identifies reference synchronization timing of the plurality of symbols for synchronization signal transmission based on synchronization signal ID information included in the received synchronization signal or transmission timing information included in the BCH signal.

3. The method of claim 1, wherein the synchronization resource interval comprises at least two non-contiguous sub-intervals.

4. A user equipment, comprising:
   a transceiver configured to transmit and receive signals; and
   a controller configured to:
      receive, from a base station, a broadcast channel (BCH) signal comprising system information, monitor a synchronization signal transmitted by the base station based on a synchronization resource interval,
receive the synchronization signal based on the monitoring of the synchronization signal, and
access the base station based on synchronization obtained from the synchronization signal,
wherein the synchronization resource interval of synchronization signal transmission periodicity comprises a plurality of symbols for synchronization signal transmission,
wherein, in case that, the synchronization resource interval and a BCH resource interval have been configured together, BCH resource transmission timing is determined based on success timing of the synchronization signal transmission, and
wherein, in case that the synchronization resource interval and the BCH resource interval have not been configured together, the BCH resource transmission timing is determined based on listen before talk (LBT) success timing in the BCH resource interval after the success of the synchronization signal transmission.

5. The user equipment of claim 4, wherein the controller is configured to identify reference synchronization timing of the plurality of symbols for synchronization signal transmission based on synchronization signal ID information included in the received synchronization signal or transmission timing information included in a broadcast channel (BCH) signal.

6. The user equipment of claim 4, wherein the synchronization resource interval comprises at least two non-contiguous sub-intervals.

7. A method performed by a base station in a wireless communication system, the method comprising:
configuring a synchronization resource interval for transmitting a synchronization signal;
performing listen before talk (LBT) based on the synchronization resource interval;
transmitting the synchronization signal in the synchronization resource interval based on a result of the execution of the LBT; and
transmitting a broadcast channel (BCH) signal comprising system information,
wherein the synchronization resource interval of synchronization signal transmission periodicity comprises a plurality of symbols for synchronization signal transmission,
wherein, in case that, the synchronization resource interval and a BCH resource interval have been configured together, BCH resource transmission timing is determined based on success timing of the synchronization signal transmission, and
wherein, in case that the synchronization resource interval and the BCH resource interval have not been configured together, the BCH resource transmission timing is determined based on LBT success timing in the BCH resource interval after the success of the synchronization signal transmission.

8. The method of claim 7,
wherein the synchronization signal comprises synchronization signal ID information, and
wherein the synchronization signal ID information is used to identify reference synchronization timing of the plurality of symbols for synchronization signal transmission.

9. The method of claim 7, wherein the synchronization resource interval comprises at least two non-contiguous sub-intervals.

10. A base station, comprising:
a transceiver configured to transmit and receive signals; and
a controller configured to:
configure a synchronization resource interval for transmitting a synchronization signal,
perform listen before talk (LBT) based on the synchronization resource interval, and
transmit the synchronization signal in the synchronization resource interval based on a result of the execution of the LBT, and
transmit a broadcast channel (BCH) signal comprising system information,
wherein the synchronization resource interval of synchronization signal transmission periodicity comprises a plurality of symbols for synchronization signal transmission,
wherein, in case that, the synchronization resource interval and a BCH resource interval have been configured together, BCH resource transmission timing is determined based on success timing of the synchronization signal transmission, and
wherein, in case that the synchronization resource interval and the BCH resource interval have not been configured together, the BCH resource transmission timing is determined based on LBT success timing in the BCH resource interval after the success of the synchronization signal transmission.

11. The base station of claim 10,
wherein the synchronization signal comprises synchronization signal ID information, and
wherein the synchronization signal ID information is used to identify reference synchronization timing of the plurality of symbols for synchronization signal transmission timings.

12. The base station of claim 10, wherein the synchronization resource interval comprises at least two non-contiguous sub-intervals.

* * * * *